(12) United States Patent
Wilklow

(10) Patent No.: US 7,414,785 B2
(45) Date of Patent: Aug. 19, 2008

(54) ULTRAVIOLET POLARIZATION BEAM SPLITTER WITH MINIMUM APODIZATION

(75) Inventor: Ronald A Wilklow, Fairfield, CT (US)

(73) Assignee: ASML Holding N.V., Veldhoven (NL)

( * ) Notice: Subject to any disclaimer, the term of this patent is extended or adjusted under 35 U.S.C. 154(b) by 0 days.

(21) Appl. No.: 10/458,629

(22) Filed: Jun. 11, 2003

(65) Prior Publication Data

US 2004/0252369 A1    Dec. 16, 2004
US 2006/0018011 A9    Jan. 26, 2006

Related U.S. Application Data

(63) Continuation-in-part of application No. 10/264,318, filed on Oct. 4, 2002, now Pat. No. 6,680,794, which is a continuation of application No. 09/538,529, filed on Mar. 30, 2000, now Pat. No. 6,480,330.

(60) Provisional application No. 60/184,782, filed on Feb. 24, 2000.

(51) Int. Cl.
*G02B 5/30* (2006.01)
*G02B 27/14* (2006.01)
*G03F 7/20* (2006.01)

(52) U.S. Cl. ................. 359/495; 359/352; 359/583

(58) Field of Classification Search ............... 359/359, 359/580, 487, 352, 488, 495, 496, 498, 583
See application file for complete search history.

(56) References Cited

U.S. PATENT DOCUMENTS

| 2,403,731 A | 7/1946 | MacNeille |
| 2,740,317 A | 4/1956 | Kelly et al. |
| 3,601,490 A | 8/1971 | Erickson |
| 4,896,952 A * | 1/1990 | Rosenbluth ............ 359/638 |
| 4,953,960 A | 9/1990 | Williamson |
| 5,031,977 A | 7/1991 | Gibson |
| 5,220,454 A * | 6/1993 | Ichihara et al. ........... 359/487 |
| 5,241,423 A * | 8/1993 | Chiu et al. ............... 359/727 |
| 5,339,441 A | 8/1994 | Kardos et al. |
| 5,400,179 A | 3/1995 | Ito |
| 5,537,260 A | 7/1996 | Williamson |
| 5,691,802 A | 11/1997 | Takahashi |

(Continued)

FOREIGN PATENT DOCUMENTS

| JP | 2001-4840 A | 1/2001 |
| JP | 2003-114326 A | 4/2003 |
| WO | WO 01/63342 A1 * | 8/2001 |
| WO | WO 2004019105 A1 * | 3/2004 |

OTHER PUBLICATIONS

Wu et al., Calcite/Barium Fluoride Ultraviolet Polarizing Prism, Applied Optics, vol. 34, No. 19 (Jul. 1, 1995), pp. 3668-3670.*

(Continued)

*Primary Examiner*—Alessandro Amari
*Assistant Examiner*—Mark Consilvio
(74) *Attorney, Agent, or Firm*—Sterne, Kessler, Goldstein & Fox P.L.L.C.

(57) ABSTRACT

A beamsplitter includes a first fluoride prism and a second fluoride prism. A coating interface is between the first and second fluoride prisms, wherein an overall R(s)*T(p) function of the beamsplitter varies no more than ±2.74% in the range of 40-50 degrees of incidence.

44 Claims, 13 Drawing Sheets

Performance of Design Example 3

U.S. PATENT DOCUMENTS

| | | | |
|---|---|---|---|
| 5,694,241 | A | 12/1997 | Ishiyama et al. |
| 5,715,055 | A | 2/1998 | Nanko et al. |
| 5,808,805 | A | 9/1998 | Takahashi |
| 5,879,820 | A | 3/1999 | Quesnel et al. |
| 5,969,882 | A | 10/1999 | Takahashi |
| 5,999,333 | A | 12/1999 | Takahashi |
| 6,212,014 | B1 | 4/2001 | Lehman et al. |
| 6,295,160 | B1 * | 9/2001 | Zhang et al. ................ 359/330 |
| 6,377,338 | B1 * | 4/2002 | Suenaga ...................... 355/67 |
| 6,480,330 | B1 | 11/2002 | McClay et al. |
| 6,501,598 | B2 | 12/2002 | Iwamoto |
| 6,680,794 | B2 | 1/2004 | McClay et al. |

OTHER PUBLICATIONS

Office Action and English Translation, dated Apr. 17, 2006, for Korean Patent Application No. 10-2002-7011044, 3 pages.

International Preliminary Examination Report, date completed Apr. 8, 2002, International Application No. PCT/US00/08461, 8 pages.

International Search Report, date completed Oct. 6, 2000, International Application No. PCT/US00/08461, 3 pages.

"Right-Angle Prisms," Casix,Inc. www.casix.com/old%20web.table/prism02.htm, copyright 1998, last revised-Jan. 28, 1999. 2 pages.

"Fused Silica Right-Angle Prism," Casix, Inc., www.casix.com/old%20web/table/prism02-fs.htm, copyright 1998, last revised-Jan. 29, 1999, 2 pages.

"Beamsplitters," Casix, Inc., www.casix.com/old%20web/optics/optics08.htm, copyright 1998, last revised-Jan. 29, 1999, 2 pages.

"Beamsplitter Penta Prisms," Casix, Inc., www.casix.com/old%20web/table/table/prism01-bs.htm, copyright 1998, last revised-Jan. 29, 1999, 1 page.

Kolbe J. et al., "Optical Losses of Fluoride Coatings for UV/VUV Applications Deposited by Reactive IAD and IBS Processes" Annual Technical Conference Proceedins Society of Vacuum Coaters, 1993, pp. 44-50.

Solomon Musikant, "Optical Materials, an Introduction to Selection and Application," Optical Engineering, vol. 6, 1985, pp. 98-105.

"Waveplates," 2 pages, internet cite: http://www/casix.com/new/waveplate.htm, printed date Nov. 12, 1999.

"Polarization Beamsplitter," Casix, Inc., www.casix.com/old%20web/table/beamsplitter03.htm, copyright 1998, last revised--Jan. 29, 1999, 1 page.

"Beamsplitter Plates," Casix, Inc. www.casix.com/old%20web/table/beamsplitter01-sin.htm, copyright 1998, last revised-Jan. 29, 1999, 1 page.

"Beamsplitter Cube," Casix, Inc., www.casix.com/old%20web/table/beamsplitter02.htm, copyright 1998, last revised--Jan. 29, 1999, 1 page.

Translation of Office Action, dated Jul. 10, 2007, for Japanese Patent Application No. 2004-173912, 6 pages.

* cited by examiner form a part of the specification, illustrate the
ULTRAVIOLET POLARIZATION BEAM SPLITTER WITH MINIMUM APODIZATION This application is a continuation-in-part of U.S. patent application Ser. No. 10/264,318, filed Oct. 4, 2002, now U.S. Pat. No. 6,680,794, which is a continuation of U.S. patent application Ser. No. 09/538,529, filed Mar. 30, 2000, now U.S. Pat. No. 6,480,330, which is a non-provisional of U.S. Provisional Patent Application No. 60/184,782, filed Feb. 24, 2000.

BACKGROUND OF THE INVENTION

1. Field of the Invention

The present invention pertains to optics, and in particular, to beam splitters used in microlithography.

2. Related Art

Photolithography (also called microlithography) is a semiconductor fabrication technology. Photolithography uses ultraviolet or visible light to generate fine patterns in a semiconductor device design. Many types of semiconductor devices, such as, diodes, transistors, and integrated circuits, can be fabricated using photolithographic techniques. Exposure systems or tools are used to carry out photolithographic techniques, such as etching, in semiconductor fabrication. An exposure system can include a light source, reticle, optical reduction system, and a wafer alignment stage. An image of a semiconductor pattern is printed or fabricated on the reticle (also called a mask). A light source illuminates the reticle to generate an image of the particular reticle pattern. An optical reduction system is used to pass a high-quality image of the reticle pattern to a wafer. See, Nonogaki et al., *Microlithography Fundamentals in Semiconductor Devices and Fabrication Technology*, Marcel Dekker, Inc., New York, N.Y. (1998), incorporated in its entirety herein by reference.

Integrated circuit designs are becoming increasingly complex. The number of components and integration density of components in layouts is increasing. Demand for an ever-decreasing minimum feature size is high. The minimum feature size (also called line width) refers to the smallest dimension of a semiconductor feature that can be fabricated within acceptable tolerances. As a result, it is increasingly important that photolithographic systems and techniques provide a higher resolution.

One approach to improve resolution is to shorten the wavelength of light used in fabrication. Increasing the numerical aperture (NA) of the optical reduction system also improves resolution. Indeed, commercial exposure systems have been developed with decreasing wavelengths of light and increasing NA.

Catadioptric optical reduction systems include a mirror that reflects the imaging light after it passes through the reticle onto a wafer. A beam splitter cube is used in the optical path of the system. A conventional beam splitter cube, however, transmits about 50% of input light and reflects about 50% of the input light. Thus, depending upon the particular configuration of optical paths, significant light loss can occur at the beam splitter.

In UV photolithography, however, it is important to maintain a high light transmissivity through an optical reduction system with little or no loss. Exposure time and the overall semiconductor fabrication time depends upon the intensity or magnitude of light output onto the wafer. To reduce light loss at the beam splitter, a polarizing beam splitter and quarter-wave plates are used.

Generally, polarizing beam splitters are designed for maximum optical throughput, but without a particular attention to the apodization they impose on the pupil of the projection optics. In optical systems having low numerical apertures (i.e., on numerical apertures corresponding to a lower range of operating angles at the beam splitter coating), this is not a significant problem, since the natural bandwidth of the coating is typically large enough to cover the requirements. However, at higher numerical apertures, the coating designs become more complex, and result in an increase in undesirable performance fluctuations over the angular range of operation.

Accordingly, what is needed is a beamsplitter with a relatively flat apodization function over a wide angular range that is usable in UV photolithography.

SUMMARY OF THE INVENTION

The present invention embodies a technique for providing a beam splitter with a relatively flat apodization function.

In an embodiment of the present invention, a beam splitter is provided whose product of the P transmittance and S transmittance is relatively flat.

In another embodiment of the present invention, a beam splitter is provided having the above characteristics that is usable for ultraviolet and deep ultraviolet photo lithographic applications.

In one aspect of the invention, there is provided a beamsplitter including a first fluoride prism and a second fluoride prism. A coating interface is between the first and second fluoride prisms, wherein an overall R(s)*T(p) function of the beamsplitter varies no more than ±2.74% in the range of 40-50 degrees of incidence.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is provided a

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention. In the drawings.

DETAILED DESCRIPTION OF THE PREFERRED EMBODIMENTS

Figure 1A:
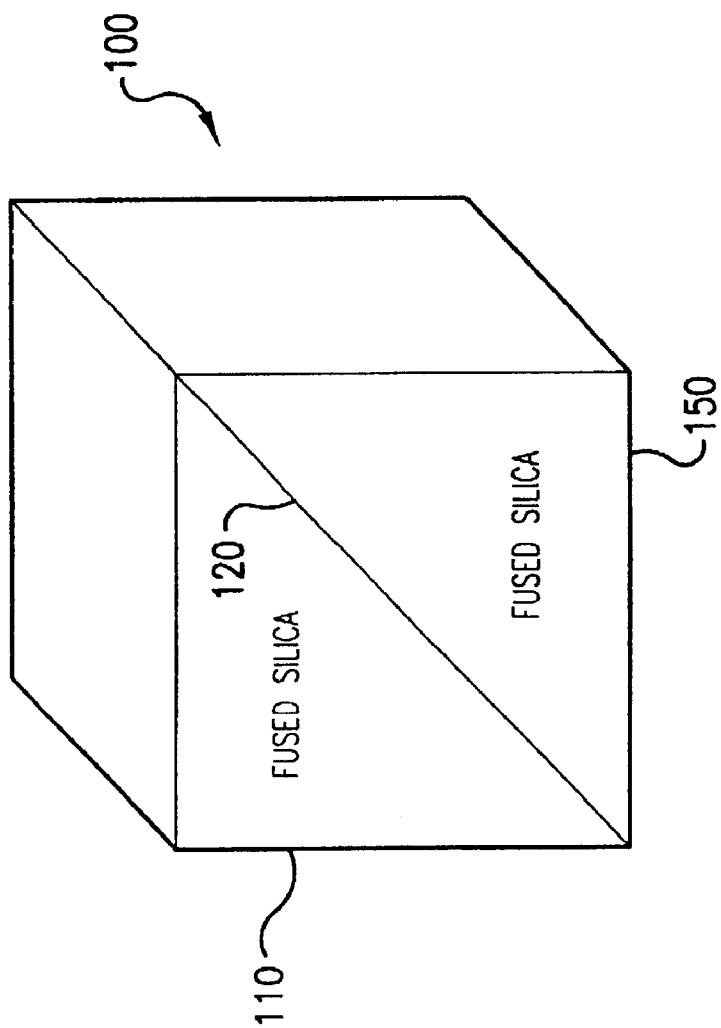
FIG. 1A is a perspective view of a conventional polarizing beam splitter cube.

The present invention will now be described with reference to the accompanying drawings. In the drawings, like reference numbers indicate identical or functionally similar elements. Additionally, the left-most digit(s) of a reference number identifies the drawing in which the reference number first appears.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

Terminology

The terms "beam splitter" or "cube" used with respect to the present invention have a broad meaning that refers to a beam splitter that includes, but is not limited to, a beam splitter having an overall cubic shape, rectangular cubic shape, or truncated cubic shape, or approximating an overall cubic shape, rectangular cubic shape, or truncated cubic shape.

The term "long conjugate end" refers to a plane at the object or reticle end of an optical reduction system.

The term "short conjugate end" refers to the plane at the image or wafer end of an optical reduction system.

The term "wafer" refers to the base material in semiconductor manufacturing, which goes through a series of photo-masking, etching and/or implementation steps.

The term "wave plate" refers to retardation plates or phase shifters made from materials which exhibit birefringence.

Figure 1B:
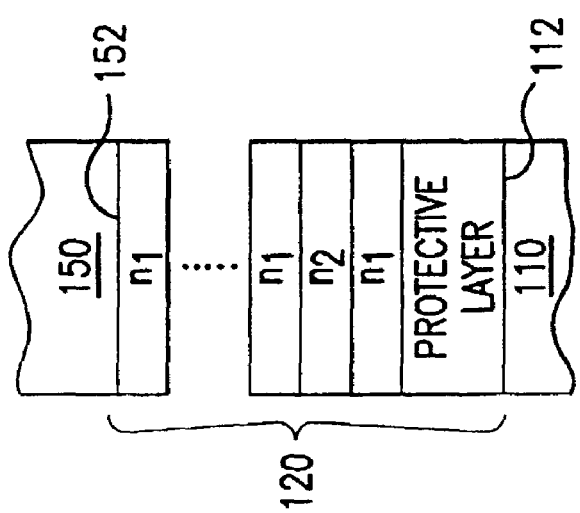
FIG. 1B is a diagram showing a cross-section of a conventional coating interface for the polarizing beam splitter cube of FIG. 1A.

FIGS. 1A and 1B illustrate an example conventional polarizing beam splitter cube 100 used in a conventional catadioptric optical reduction system. Polarizing beam splitter cube 100 includes two prisms 110, 150, and a coating interface 120. Prisms 110, 150 are made of fused silica and are transmissive at wavelengths of 248 nm and 193 nm. Coating interface 120 is a multi-layer stack. The multi-layer stack includes alternating thin film layers. The alternating thin film layers are made of thin films having relatively high and low indices of refraction ($n_1$ and $n_2$). The alternating thin film layers and their respective indices of refraction are selected such that the MacNeille condition (also called Brewster condition) is satisfied. In one example, the high index of refraction thin film material is an aluminum oxide. The low index of refraction material is aluminum fluoride. A protective layer may be added during the fabrication of the stack. Cement or glue is included to attach one of the alternating layers to a prism 150 at face 152 or to attach the protective layer to prism 110 at face 112.

Figure 2A:
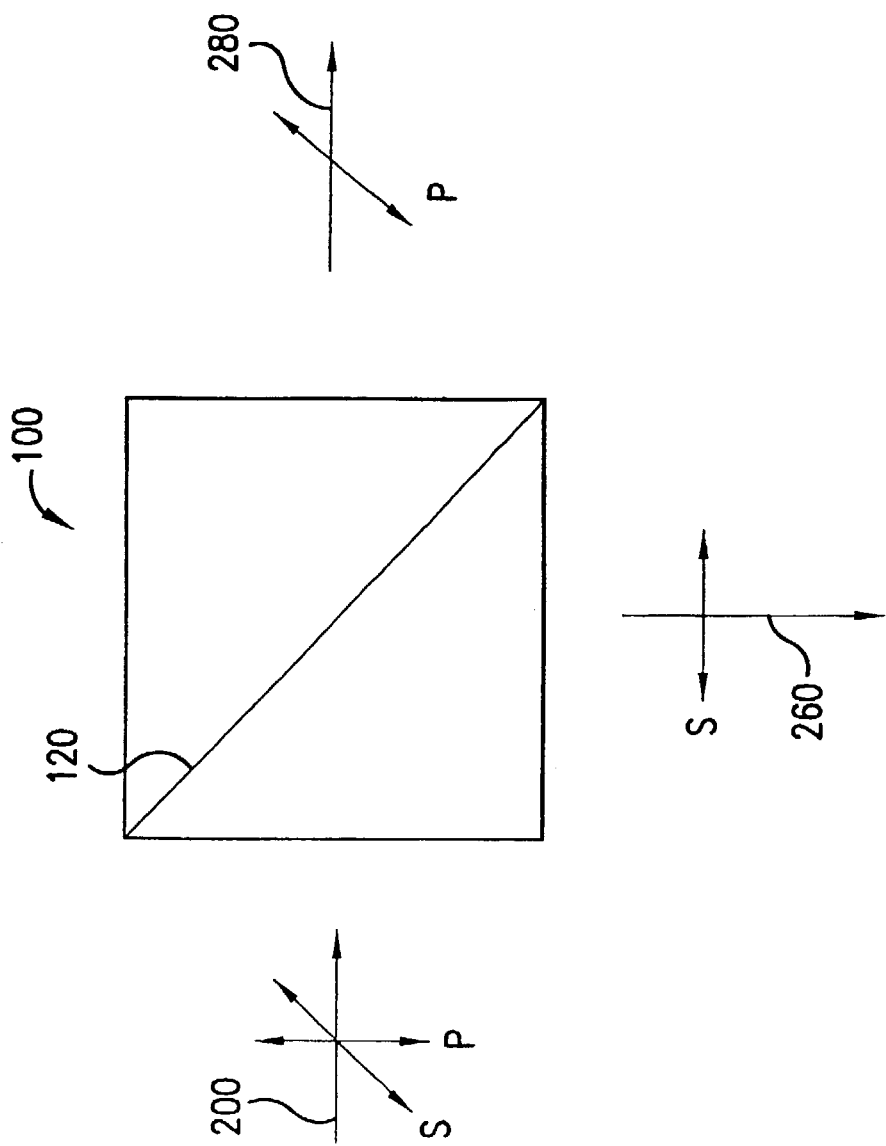
FIG. 2A illustrates how the polarizing beam splitter cube of FIG. 1A separates light into separate polarization states.
Figure 2B:
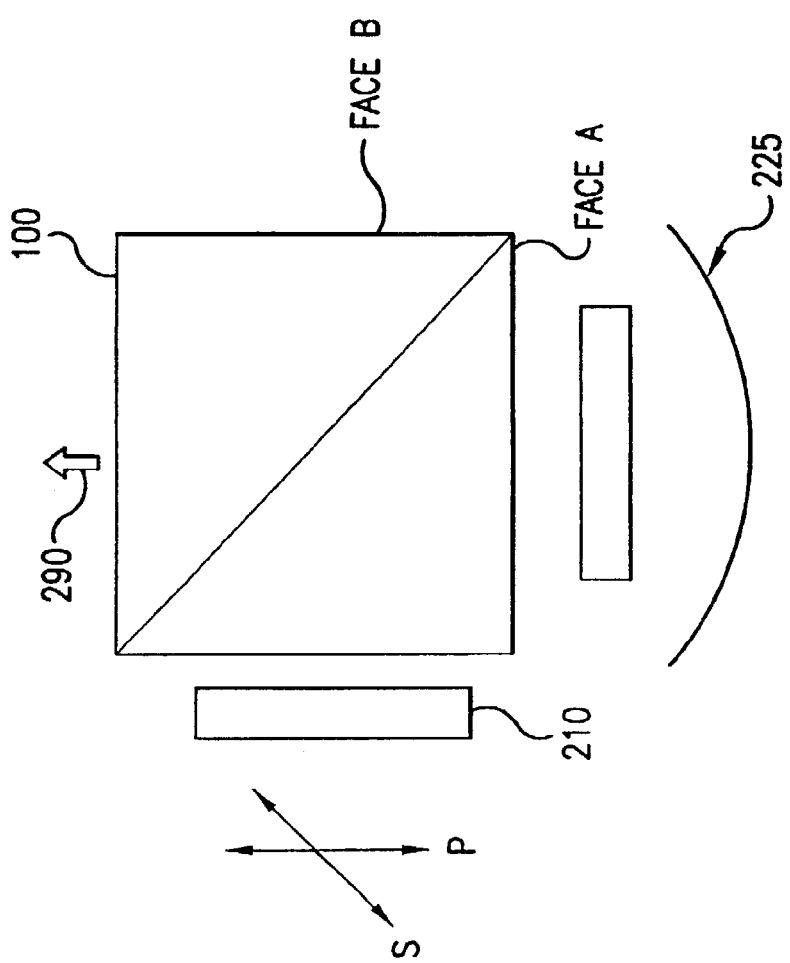
FIG. 2B illustrates how the polarizing beam splitter cube of FIG. 1A can be used as part of a catadioptric optical reduction system to improve transmission efficiency.

As shown in FIG. 2A, the MacNeille condition (as described in U.S. Pat. No. 2,403,731) is a condition at which light 200 incident upon the multi-layer stack is separated into two beams 260, 280 having different polarization states. For example, output beam 260 is an S-polarized beam, and output beam 280 is a P-polarized beam (or polarized at 90 degrees with respect to each other). FIG. 2B shows the advantage of using a polarizing beam splitter in a catadioptric optical reduction system to minimize light loss. Incident light 200 (usually having S and P polarization states) passes through a quarter-wave plate 210. Quarter wave plate 210 converts all of incident light 200 to a linearly polarized beam in an S polarization state. Beam splitter cube 100 reflects all or nearly all of the S polarization to quarter wave plate 220 and mirror 225. Quarter wave plate 220 when doubled passed acts like a half-waveplate. Quarter wave plate 220 converts the S polarization light to circular polarization, and after reflection from mirror 225, converts light into P-polarized light. The P-polarized light is transmitted by beam splitter cube 100 and output as a P-polarized beam 290 toward the wafer. In this way, the polarizing beam splitter 100 and quarter wave plates 210, 220 avoid light loss in a catadioptric optical reduction system that includes a mirror 225. Note, as an alternative, mirror 225 and quarter wave plate 220 can be positioned at face B of cube 100, rather than at face A, and still achieve the same complete or nearly complete light transmission over a compact optical path length.

The invention, which will be further described below, can be used in catadioptric photolithography systems. It can be used in any polarizing beamsplitter system in which the beamsplitter is used over a range of angles and in which the light passes through the beamsplitter twice at orthogonal polarizations.

Typical polarizing beamsplitters, as described above with reference to FIGS. 1A-2B, are designed for maximum optical throughput but without particular attention to the apodization they impose on the pupil of the projection optics. This is not a significant problem in systems with low numerical apertures (i.e., a lower range of operating angles at the beamsplitter coating), where the natural bandwidth of the coating was large enough to cover the requirement. At higher numerical apertures, coating designs become more complex, with a resultant increase in undesirable performance fluctuations over the angular range of operation.

In the beamsplitter of the present invention, light passes through the beamsplitter twice, first in S polarization and then again in P polarization. The two performance curves (S and P as functions of angle) multiplied together determine the overall apodization function that the coating introduces into the system pupil. Previous efforts to design coatings with lower pupil apodization focused on flattening the S and P performance curves individually. In the design of the beamsplitter coating it is relatively easy to effect changes in the performance for the S polarization, and more difficult to effect changes in the P polarization performance. If the beamsplitter is doubled-passed in the system, P polarization performance variations can be compensated for by a coating whose S polarization performance has the opposite "signature." When the two functions R(s) and T(p) are multiplied together, they produce an apodization function R(s)*T(p) that is relatively flat.

To achieve a relatively flat R(s)*T(p) function, the present invention provides a ultraviolet (UV) polarizing beam splitter. The UV polarizing beam splitter is transmissive to light at wavelengths equal to or less than 200 nm, for example, at 193 nm or 157 nm. The UV polarizing beam splitter can image at high quality light incident over a wide range of reflectance and transmittance angles. The UV polarizing beam splitter can accommodate divergent light in an optical reduction system having a numeric aperture at a wafer plane greater than 0.6, and for example at 0.75. In different embodiments, the UV polarizing beam splitter can have a cubic, rectangular cubic, or truncated cubic shape, or approximates a cubic, rectangular cubic, or truncated cubic shape.

In one embodiment, a UV polarizing beam splitter cube comprises a pair of prisms and a coating interface. The prisms are made of at least a fluoride material, such as, calcium fluoride (CaF$_2$) or barium fluoride (BaF$_2$). The coating interface has a plurality of layers of a thin film fluoride material. In one example implementation, the coating interface includes a multi-layer stack of alternating layers of thin film fluoride materials. The alternating layers of thin film fluoride materials comprise first and second fluoride materials. The first and second fluoride materials have respective first and second refractive indices. The first refractive index is greater than (or higher than) the second refractive index. In one feature of the present invention, the first and second refractive indices form a stack of fluoride materials having relatively high and low refractive indices of refraction such that the coating interface separates UV light (including light at wavelengths less than 200 nm, for example, at 193 nm or 157 nm) depending on two polarized states.

In one example, to achieve a relatively flat R(s)*T(p) function, the coating interface comprises a multi-layer design of the form (H L)$^n$ H or (H L)$^n$, where H indicates a layer of a first fluoride material having a relatively high refractive index. The first fluoride material can include, but is not limited to, gadolinium tri-fluoride (GdF$_3$), lanthanum tri-fluoride (LaF$_3$), samarium fluoride (SmF$_3$), europium fluoride (EuF$_3$), terbium fluoride (TbF$_3$), dysprosium fluoride (DyF$_3$), holmium fluoride (HoF$_3$), erbium fluoride (ErF$_3$), thulium fluoride (TmF$_3$), ytterbium fluoride (YbF$_3$), lutetium fluoride (LuF$_3$), zirconium fluoride (ZrF$_4$), hafnium fluoride (HfF$_4$), yttrium fluoride (YF$_3$), neodymium fluoride (NdF$_3$), any of the other lanthanide series tri-fluorides, metallic fluorides, or other high index, ultraviolet transparent material. L indicates a layer of a second fluoride material having a relatively low refractive index. The second fluoride material can include, but is not limited to, magnesium fluoride (MgF$_2$), aluminum tri-fluoride (AlF$_3$), barium fluoride (BaF$_2$), strontium fluoride (SrF$_2$), calcium fluoride (CaF$_2$), lithium fluoride (LiF), and sodium fluoride (NaF), or other low index, ultraviolet transparent material. The value "n" indicates the basic (H L) group is repeated n times in a multi-layer stack, where n is a whole number equal to one or more.

According to a further feature, the prisms and coating interface are joined by optical contact. No cement is needed, although its use is not precluded.

Further multi-layer designs can be generated by computer iterated design. Layers in a multi-layer stack can also be graded across the hypotenuse face of a prism to adjust layer thicknesses at any point so as to compensate for changes in the incidence angle of the light.

The present invention provides a method for splitting an incident light beam based on polarization state. The method includes the step of orienting a coating interface having a plurality of layers of a fluoride material at an angle relative to the incident light such that the coating interface transmits incident light in a first polarization state and reflects incident light in a second polarization state. In one example, the method further includes the step of selecting thicknesses of alternating thin film layers and their respective indices of refraction such that the coating interface transmits incident light at a wavelength equal to or less than 200 nm in a first polarization state and reflects incident light at a wavelength equal to or less than 200 nm in a second polarization state.

UV Polarizing Beam Splitter

Figure 3A:
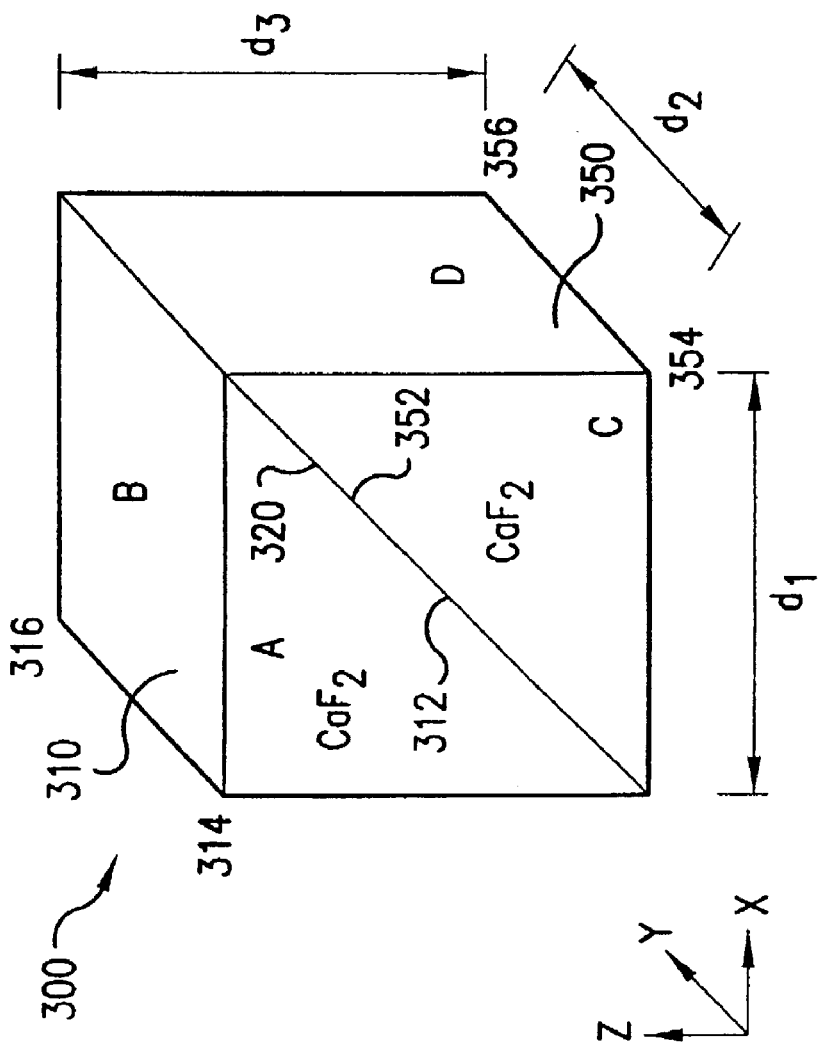
FIG. 3A is a perspective view of a UV polarizing beam splitter cube according to one embodiment of the present invention.

FIG. 3A is a perspective view of a UV polarizing beam splitter cube 300 according to one embodiment of the present invention. UV polarizing beam splitter cube 300 has a pair of prisms 310, 350 and a coating interface 320. Prisms 310, 350 are preferably made of a fluoride material. Coating interface 320 has a plurality of layers of a thin film fluoride material.

In the example shown in FIG. 3A, prism 310 is a right angle prism having five faces. These five faces consist of two side faces, two end faces, and a hypotenuse face. The two side faces are square (or approximately square) at their perimeter and share right angle corners 314 and 316. One side face B is shown in FIG. 3A, the other side face is not shown. The two end faces are both right triangles. One end face A, shown in FIG. 3A, is a right triangle at its perimeter formed by a ninety degree (or approximately ninety degree) angle at corner 314 and two 45 degree (or approximately 45 degree) angles opposite corner 314. The other end face (not shown) is the right triangle formed by a ninety degree (or approximately ninety degree) angle at corner 316 and two 45 degree (or approximately 45 degree) angles opposite corner 316. The hypotenuse face is a planar face 312 which is on a hypotenuse side of right angle prism 310 opposite right angle corners 314, 316.

Prism 350 is also a right angle prism having five faces. These five faces consist of two side faces, two end faces, and a hypotenuse face. The two side faces are square (or approximately square) at their perimeter and share right angle corners 354 and 356. One side face D is shown in FIG. 3A, the other side face is not shown. The two end faces are both right triangles. One end face C, shown in FIG. 3A, is a right triangle at its perimeter formed by a ninety degree (or approximately ninety degree) angle at corner 354 and two 45 degree (or approximately 45 degree) angles opposite corner 354. The other end face (not shown) is the right triangle formed by a ninety degree (or approximately ninety degree) angle at corner 356 and two 45 degree (or approximately 45 degree) angles opposite corner 356. The hypotenuse face is a planar face 352 which is on a hypotenuse side of right angle prism 350 opposite right angle corners 354, 356. Coating interface 320 lies between hypotenuse faces 312 and 352.

UV polarizing beam splitter cube 300 has width, depth, and height dimensions equal to values $d_1$, $d_2$, and $d_3$ respectively, as shown in FIG. 3A. In one example implementation, $d_1$, $d_2$, and $d_3$ are equal (or approximately equal) such that prisms 310 and 350 when coupled along their faces 312 and 352 have an overall cube or cube-like shape. In one example implementation, prisms 310, 350 are made of calcium fluoride (CaF$_2$) material, barium fluoride (BaF$_2$) material, or a combination thereof.

Coating Interface

Figure 3B:
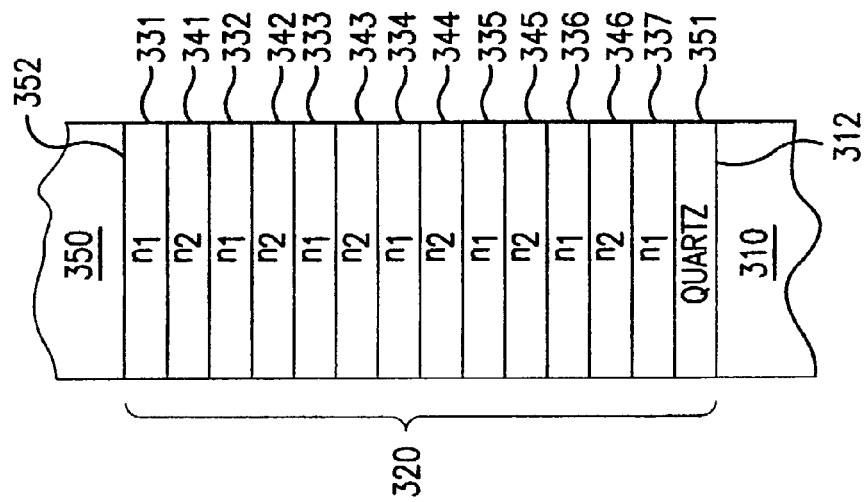
FIG. 3B is a diagram showing a cross-section of a coating interface for the UV polarizing beam splitter cube of FIG. 3A.

FIG. 3B is a diagram showing a cross-section of an example coating interface 320, used to achieve a relatively flat R(s)*T(p) function, in greater detail. Coating interface 320 includes a stack of alternating layers of thin film fluoride materials (331-337, 341-346), and a protective layer 351. Anti-reflection (AR) coatings (not shown) can also be included in coating interface 320. Protective layer 351 and AR coatings are optional. Also, the present invention in not limited to thirteen layers of alternating layers of thin film fluoride materials. In general, larger and smaller numbers of alternating layers of thin film fluoride materials can be used as would be apparent to a person skilled in the art given this description.

Further, FIG. 3B shows the coating interface 320 mounted on face 352 of prism 350. The stack of alternating layers of thin film fluoride materials (331-337, 341-346) and/or protective layer 351 are grown, etched, or fabricated on face 352 using conventional thin film techniques. Prism 310 is then placed in optical contact with the coating interface 320. In this way, prisms 310 and 350 are coupled strongly through coating interface 320 resulting in a very strong polarizing beam splitter cube. One further feature of the present invention is that it applies this optical contact (where optical components are joined so closely together that van der Waal's forces couple the components to one another) in a complex geometry involving angled surfaces, such as, the hypotenuse face of prism 310.

The alternating layers of thin film fluoride materials include two groups of layers. The first group of layers 331-

337 has a first index of refraction $n_1$. The second group of layers 341-346 has a second index of refraction $n_2$. According to one feature of the present invention, the first and second refractive indices $n_1$ and $n_2$ are different. In particular, the second refractive index $n_2$ is relatively low compared to the first refractive index $n_1$. In this way, coating interface 320 includes a stack of fluoride materials 331-337, 341-346 having alternating relatively high and low refractive indices $n_1$, $n_2$ such that the coating interface 320 separates incident UV light based on two different polarization states, such as S and P polarization states. According to the present invention, polarizing beam splitter cube 300 can be used with light at wavelengths equal to or less than 200 nm, and in particular, at 193 or 157.6 nm, for example.

As noted above, to achieve a relatively flat R(s)*T(p) function, the coating interface 320 comprises a multi-layer design of the form $(H\,L)^n\,H$ or $(H\,L)^n$, where H indicates a layer of a first fluoride material having relatively high refractive index. The first fluoride material can include, but is not limited to, gadolinium tri-fluoride ($GdF_3$), lanthanum tri-fluoride ($LaF_3$), samarium fluoride ($SmF_3$), europium fluoride ($EuF_3$), terbium fluoride ($TbF_3$), dysprosium fluoride ($DyF_3$), holmium fluoride ($HoF_3$), erbium fluoride ($ErF_3$), thulium fluoride ($TmF_3$), ytterbium fluoride ($YbF_3$), lutetium fluoride ($LuF_3$), zirconium fluoride ($ZrF_4$), hafnium fluoride ($HfF_4$), yttrium fluoride ($YF_3$), neodymium fluoride ($NdF_3$), any of the other lanthanide series tri-fluorides, metallic fluorides, or other high index, ultraviolet-transparent material. L indicates a layer of a second fluoride material having relatively low refractive index. The second fluoride material can include, but is not limited to, magnesium fluoride ($MgF_2$), aluminum tri-fluoride ($AlF_3$), barium fluoride ($BaF_2$), strontium fluoride ($SrF_2$), calcium fluoride ($CaF_2$), lithium fluoride (LiF), and sodium fluoride (NaF), or other low index, ultraviolet transparent material. The superscript value "n" indicates the basic (H L) group is repeated n times in a multi-layer stack, where n is a whole number equal to one or more.

Other designs for a multi-layer coating interface 320, 520 can be generated through a computer iterated technique as would be apparent to a person skilled in the art given this description.

The examples below are illustrative of how a flat overall R(s)*T(p) function can be achieved using a number of alternating coating layers.

BEAMSPLITTER EXAMPLE 1

The table below illustrates one example of a coating interface 320 for 157.6 nm that satisfies the requirements of a flat R(s)*T(p) apodization function using a total of 27 alternating layers (n=13) of $MgF_2$ and $LaF_3$. This example provides a relatively flat R(s)*T(p) function between 35 and 55 degrees incident. In that range, the R(s)*T(p) function ranges from a maximum of 70.85 to a minimum of 65.37, or a delta of 5.48% (±2.74%).

TABLE 1

| Layer Number | Material | Mechanical Thickness (nm) | Layer Index (at 157.6 nm) | Optical Thickness (quarter-waves at 157.6 nm) |
|---|---|---|---|---|
| exit medium | $CaF_2$ | massive | | |
| 1 | $MgF_2$ | 37.14 | 1.465 | 1.381 |
| 2 | $LaF_3$ | 9.18 | 1.78 | 0.415 |
| 3 | $MgF_2$ | 36.58 | 1.465 | 1.360 |
| 4 | $LaF_3$ | 16.11 | 1.78 | 0.728 |
| 5 | $MgF_2$ | 45.68 | 1.465 | 1.699 |
| 6 | $LaF_3$ | 8.92 | 1.78 | 0.403 |
| 7 | $MgF_2$ | 42.92 | 1.465 | 1.596 |
| 8 | $LaF_3$ | 22.20 | 1.78 | 1.003 |

TABLE 1-continued

| Layer Number | Material | Mechanical Thickness (nm) | Layer Index (at 157.6 nm) | Optical Thickness (quarter-waves at 157.6 nm) |
|---|---|---|---|---|
| 9 | $MgF_2$ | 32.03 | 1.465 | 1.191 |
| 10 | $LaF_3$ | 19.82 | 1.78 | 0.895 |
| 11 | $MgF_2$ | 30.10 | 1.465 | 1.119 |
| 12 | $LaF_3$ | 24.30 | 1.78 | 1.098 |
| 13 | $MgF_2$ | 31.56 | 1.465 | 1.173 |
| 14 | $LaF_3$ | 25.91 | 1.78 | 1.171 |
| 15 | $MgF_2$ | 30.78 | 1.465 | 1.144 |
| 16 | $LaF_3$ | 24.27 | 1.78 | 1.096 |
| 17 | $MgF_2$ | 28.51 | 1.465 | 1.060 |
| 18 | $LaF_3$ | 23.46 | 1.78 | 1.060 |
| 19 | $MgF_2$ | 31.52 | 1.465 | 1.172 |
| 20 | $LaF_3$ | 27.37 | 1.78 | 1.237 |
| 21 | $MgF_2$ | 35.97 | 1.465 | 1.337 |
| 22 | $LaF_3$ | 29.89 | 1.78 | 1.350 |
| 23 | $MgF_2$ | 39.21 | 1.465 | 1.458 |
| 24 | $LaF_3$ | 30.97 | 1.78 | 1.399 |
| 25 | $MgF_2$ | 42.48 | 1.465 | 1.580 |
| 26 | $LaF_3$ | 30.31 | 1.78 | 1.369 |
| 27 | $MgF_2$ | 31.33 | 1.465 | 1.165 |
| entrance medium | $CaF_2$ | massive | | |

Figure 4:
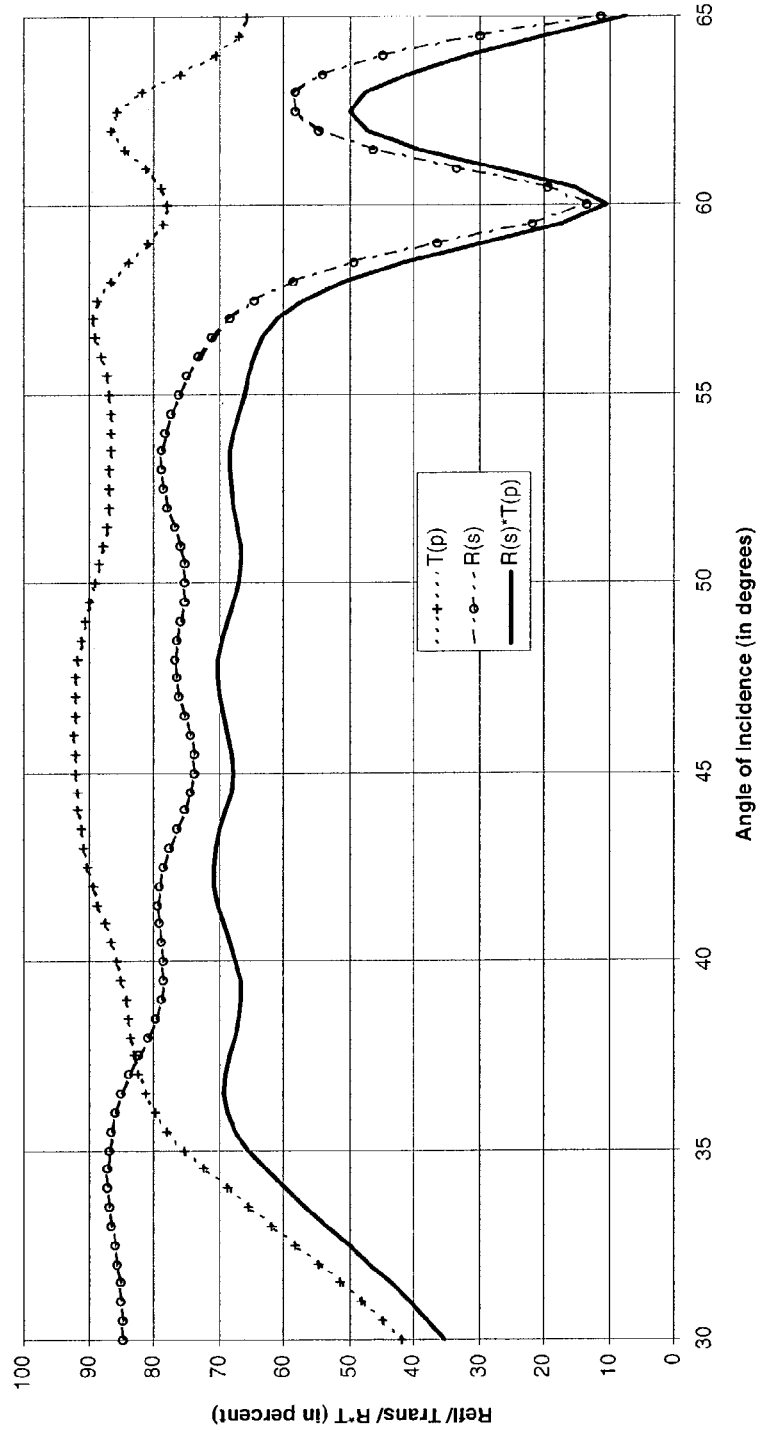
FIGS. 4-10 illustrate exemplary beamsplitter transmission performance according to the present invention.

The R(s), T(p) and the overall R(s)*T(p) functions are shown in FIG. 4 in graphical form, and are illustrated in the Table 2 below in tabular form:

TABLE 2

| Wavelength | 157.6 nm | | |
|---|---|---|---|
| Range | 35-55 degrees | | |
| Substrate | $CaF_2$ | | |
| H | $LaF_3$ | | |
| L | $MgF_2$ | | |

| angle | T(p) | R(s) | R(s) * T(p) |
|---|---|---|---|
| 30.0 | 41.67 | 84.81 | 35.34 |
| 30.5 | 44.75 | 84.78 | 37.94 |
| 31.0 | 47.94 | 84.93 | 40.71 |
| 31.5 | 51.23 | 85.21 | 43.65 |
| 32.0 | 54.62 | 85.60 | 46.75 |
| 32.5 | 58.10 | 86.03 | 49.98 |
| 33.0 | 61.66 | 86.45 | 53.30 |
| 33.5 | 65.24 | 86.79 | 56.62 |
| 34.0 | 68.77 | 87.02 | 59.84 |
| 34.5 | 72.13 | 87.08 | 62.82 |
| 35.0 | 75.18 | 86.96 | 65.37 |
| 35.5 | 77.77 | 86.60 | 67.35 |
| 36.0 | 79.83 | 85.98 | 68.64 |
| 36.5 | 81.33 | 85.07 | 69.19 |
| 37.0 | 82.35 | 83.89 | 69.08 |
| 37.5 | 83.00 | 82.48 | 68.46 |
| 38.0 | 83.45 | 81.02 | 67.60 |
| 38.5 | 83.85 | 79.72 | 66.84 |
| 39.0 | 84.33 | 78.83 | 66.47 |
| 39.5 | 84.94 | 78.47 | 66.65 |
| 40.0 | 85.72 | 78.57 | 67.35 |
| 40.5 | 86.61 | 78.91 | 68.35 |
| 41.0 | 87.57 | 79.25 | 69.39 |
| 41.5 | 88.51 | 79.38 | 70.26 |
| 42.0 | 89.37 | 79.19 | 70.78 |
| 42.5 | 90.11 | 78.63 | 70.85 |
| 43.0 | 90.71 | 77.69 | 70.48 |
| 43.5 | 91.18 | 76.49 | 69.74 |
| 44.0 | 91.52 | 75.23 | 68.85 |
| 44.5 | 91.77 | 74.19 | 68.08 |
| 45.0 | 91.94 | 73.68 | 67.74 |
| 45.5 | 92.05 | 73.80 | 67.93 |
| 46.0 | 92.10 | 74.42 | 68.54 |
| 46.5 | 92.09 | 75.26 | 69.31 |
| 47.0 | 92.00 | 76.02 | 69.94 |
| 47.5 | 91.82 | 76.49 | 70.23 |
| 48.0 | 91.51 | 76.59 | 70.09 |

TABLE 2-continued

|  | Wavelength Range | 157.6 nm 35-55 degrees |  |
|---|---|---|---|
|  | Substrate | CaF$_2$ |  |
|  | H | LaF$_3$ |  |
|  | L | MgF$_2$ |  |
| angle | T(p) | R(s) | R(s) * T(p) |
| 48.5 | 91.07 | 76.34 | 69.52 |
| 49.0 | 90.47 | 75.85 | 68.63 |
| 49.5 | 89.77 | 75.35 | 67.64 |
| 50.0 | 89.02 | 75.10 | 66.85 |
| 50.5 | 88.30 | 75.29 | 66.48 |
| 51.0 | 87.70 | 75.94 | 66.60 |
| 51.5 | 87.27 | 76.86 | 67.08 |
| 52.0 | 87.00 | 77.80 | 67.69 |
| 52.5 | 86.84 | 78.53 | 68.19 |
| 53.0 | 86.72 | 78.88 | 68.40 |
| 53.5 | 86.59 | 78.81 | 68.24 |
| 54.0 | 86.48 | 78.31 | 67.72 |
| 54.5 | 86.48 | 77.43 | 66.96 |
| 55.0 | 86.72 | 76.24 | 66.11 |
| 55.5 | 87.29 | 74.80 | 65.30 |
| 56.0 | 88.13 | 73.13 | 64.45 |
| 56.5 | 88.95 | 71.10 | 63.24 |
| 57.0 | 89.26 | 68.38 | 61.04 |
| 57.5 | 88.54 | 64.44 | 57.06 |
| 58.0 | 86.61 | 58.46 | 50.63 |
| 58.5 | 83.78 | 49.39 | 41.38 |
| 59.0 | 80.81 | 36.52 | 29.52 |
| 59.5 | 78.60 | 21.85 | 17.17 |
| 60.0 | 77.82 | 13.52 | 10.52 |
| 60.5 | 78.79 | 19.28 | 15.19 |
| 61.0 | 81.31 | 33.46 | 27.20 |
| 61.5 | 84.46 | 46.33 | 39.13 |
| 62.0 | 86.54 | 54.54 | 47.19 |
| 62.5 | 85.76 | 58.28 | 49.98 |
| 63.0 | 81.71 | 58.10 | 47.47 |
| 63.5 | 75.84 | 53.92 | 40.90 |
| 64.0 | 70.32 | 44.86 | 31.55 |
| 64.5 | 66.72 | 29.85 | 19.92 |
| 65.0 | 65.78 | 11.20 | 7.37 |

BEAMSPLITTER EXAMPLE 2

Table 3 below illustrates another example of a coating interface 320 for 157.6 nm that satisfies the requirements of a flat R(s)*T(p) apodization function using a total of 29 alternating layers (n=14) of MgF$_2$ and LaF$_3$. This example provides a relatively flat R(s)*T(p) function between 35 and 55 degrees incident. In that range, the R(s)*T(p) function ranges from a maximum of 67.9% to a minimum of 66.15%, or a delta of 1.74% (±0.87%).

TABLE 3

| Layer Number | Material | Mechanical Thickness (nm) | Layer Index (at 157.6 nm) | Optical Thickness (quarter-waves at 157.6 nm) |
|---|---|---|---|---|
| exit medium | CaF$_2$ | massive |  |  |
| 1 | MgF$_2$ | 36.50 | 1.465 | 1.357 |
| 2 | LaF$_3$ | 7.94 | 1.78 | 0.359 |
| 3 | MgF$_2$ | 36.32 | 1.465 | 1.350 |
| 4 | LaF$_3$ | 16.76 | 1.78 | 0.757 |
| 5 | MgF$_2$ | 38.91 | 1.465 | 1.447 |
| 6 | LaF$_3$ | 14.25 | 1.78 | 0.644 |
| 7 | MgF$_2$ | 34.13 | 1.465 | 1.269 |
| 8 | LaF$_3$ | 22.09 | 1.78 | 0.998 |
| 9 | MgF$_2$ | 32.09 | 1.465 | 1.193 |
| 10 | LaF$_3$ | 23.17 | 1.78 | 1.047 |
| 11 | MgF$_2$ | 29.18 | 1.465 | 1.085 |
| 12 | LaF$_3$ | 22.79 | 1.78 | 1.030 |
| 13 | MgF$_2$ | 29.33 | 1.465 | 1.091 |

TABLE 3-continued

| Layer Number | Material | Mechanical Thickness (nm) | Layer Index (at 157.6 nm) | Optical Thickness (quarter-waves at 157.6 nm) |
|---|---|---|---|---|
| 14 | LaF$_3$ | 24.78 | 1.78 | 1.120 |
| 15 | MgF$_2$ | 30.99 | 1.465 | 1.152 |
| 16 | LaF$_3$ | 25.57 | 1.78 | 1.155 |
| 17 | MgF$_2$ | 30.99 | 1.465 | 1.152 |
| 18 | LaF$_3$ | 23.80 | 1.78 | 1.075 |
| 19 | MgF$_2$ | 29.45 | 1.465 | 1.095 |
| 20 | LaF$_3$ | 21.68 | 1.78 | 0.979 |
| 21 | MgF$_2$ | 32.53 | 1.465 | 1.210 |
| 22 | LaF$_3$ | 25.53 | 1.78 | 1.153 |
| 23 | MgF$_2$ | 39.95 | 1.465 | 1.485 |
| 24 | LaF$_3$ | 29.40 | 1.78 | 1.328 |
| 25 | MgF$_2$ | 44.37 | 1.465 | 1.650 |
| 26 | LaF$_3$ | 28.78 | 1.78 | 1.300 |
| 27 | MgF$_2$ | 41.05 | 1.465 | 1.526 |
| 28 | LaF$_3$ | 25.76 | 1.78 | 1.164 |
| 29 | MgF$_2$ | 24.85 | 1.465 | 0.924 |
| entrance medium | CaF$_2$ | massive |  |  |

Figure 5:
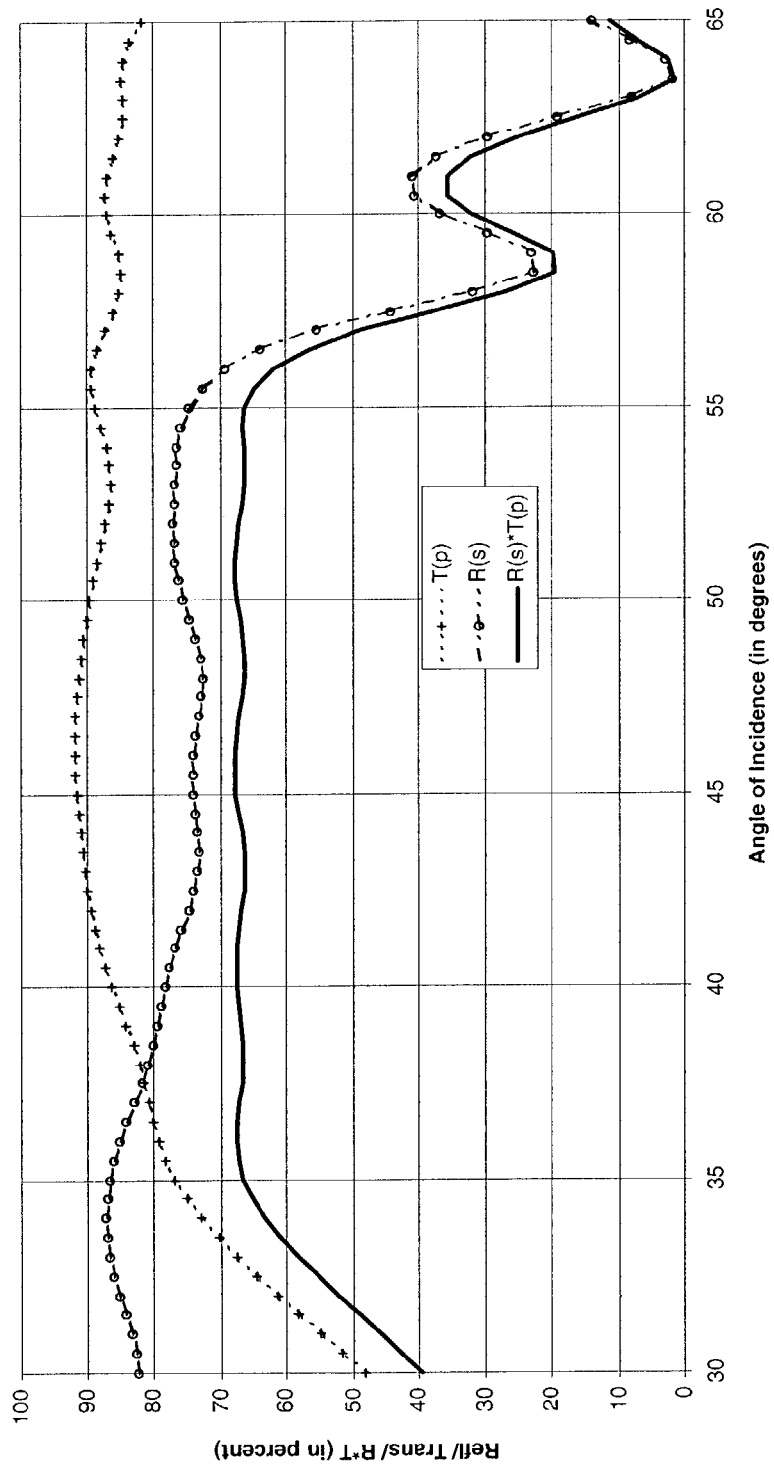

The R(s), T(p) and the overall R(s)*T(p) functions are shown in FIG. 5 in graphical form, and are illustrated in the Table 2 below in tabular form:

TABLE 4

|  | Wavelength Range | 157.6 nm 35-55 degrees |  |
|---|---|---|---|
|  | Substrate | CaF$_2$ |  |
|  | H | LaF$_3$ |  |
|  | L | MgF$_2$ |  |
| angle | T(p) | R(s) | R(s) * T(p) |
| 30.0 | 47.96 | 82.40 | 39.52 |
| 30.5 | 51.50 | 82.73 | 42.61 |
| 31.0 | 54.89 | 83.39 | 45.77 |
| 31.5 | 58.15 | 84.21 | 48.97 |
| 32.0 | 61.31 | 85.06 | 52.15 |
| 32.5 | 64.38 | 85.83 | 55.26 |
| 33.0 | 67.36 | 86.45 | 58.23 |
| 33.5 | 70.17 | 86.85 | 60.95 |
| 34.0 | 72.73 | 87.03 | 63.30 |
| 34.5 | 74.94 | 86.96 | 65.17 |
| 35.0 | 76.75 | 86.63 | 66.49 |
| 35.5 | 78.15 | 86.05 | 67.25 |
| 36.0 | 79.21 | 85.22 | 67.50 |
| 36.5 | 80.02 | 84.20 | 67.38 |
| 37.0 | 80.73 | 83.06 | 67.05 |
| 37.5 | 81.43 | 81.93 | 66.71 |
| 38.0 | 82.21 | 80.90 | 66.51 |
| 38.5 | 83.10 | 80.07 | 66.53 |
| 39.0 | 84.08 | 79.40 | 66.77 |
| 39.5 | 85.13 | 78.84 | 67.11 |
| 40.0 | 86.16 | 78.26 | 67.43 |
| 40.5 | 87.13 | 77.58 | 67.59 |
| 41.0 | 87.99 | 76.74 | 67.52 |
| 41.5 | 88.71 | 75.77 | 67.22 |
| 42.0 | 89.31 | 74.77 | 66.78 |
| 42.5 | 89.80 | 73.90 | 66.36 |
| 43.0 | 90.22 | 73.32 | 66.15 |
| 43.5 | 90.57 | 73.14 | 66.24 |
| 44.0 | 90.88 | 73.30 | 66.61 |
| 44.5 | 91.15 | 73.65 | 67.13 |
| 45.0 | 91.39 | 73.99 | 67.61 |
| 45.5 | 91.57 | 74.15 | 67.90 |
| 46.0 | 91.67 | 74.06 | 67.89 |
| 46.5 | 91.68 | 73.72 | 67.58 |
| 47.0 | 91.58 | 73.24 | 67.07 |
| 47.5 | 91.37 | 72.82 | 66.53 |
| 48.0 | 91.07 | 72.67 | 66.18 |
| 48.5 | 90.71 | 72.93 | 66.15 |
| 49.0 | 90.32 | 73.60 | 66.47 |
| 49.5 | 89.91 | 74.50 | 66.99 |

TABLE 4-continued

| | Wavelength Range | 157.6 nm 35-55 degrees | |
|---|---|---|---|
| | Substrate | CaF$_2$ | |
| | H | LaF$_3$ | |
| | L | MgF$_2$ | |
| angle | T(p) | R(s) | R(s) * T(p) |
| 50.0 | 89.49 | 75.42 | 67.49 |
| 50.5 | 89.02 | 76.16 | 67.80 |
| 51.0 | 88.46 | 76.65 | 67.81 |
| 51.5 | 87.83 | 76.87 | 67.51 |
| 52.0 | 87.18 | 76.88 | 67.02 |
| 52.5 | 86.62 | 76.78 | 66.51 |
| 53.0 | 86.34 | 76.66 | 66.19 |
| 53.5 | 86.44 | 76.53 | 66.15 |
| 54.0 | 86.97 | 76.28 | 66.35 |
| 54.5 | 87.83 | 75.74 | 66.52 |
| 55.0 | 88.73 | 74.63 | 66.22 |
| 55.5 | 89.32 | 72.61 | 64.85 |
| 56.0 | 89.26 | 69.21 | 61.78 |
| 56.5 | 88.48 | 63.81 | 56.46 |
| 57.0 | 87.19 | 55.64 | 48.51 |
| 57.5 | 85.85 | 44.32 | 38.05 |
| 58.0 | 84.93 | 31.55 | 26.79 |
| 58.5 | 84.71 | 22.80 | 19.32 |
| 59.0 | 85.20 | 23.04 | 19.63 |
| 59.5 | 86.12 | 29.65 | 25.53 |
| 60.0 | 86.96 | 36.61 | 31.84 |
| 60.5 | 87.25 | 40.65 | 35.46 |
| 61.0 | 86.82 | 40.89 | 35.50 |
| 61.5 | 85.90 | 37.21 | 31.97 |
| 62.0 | 84.99 | 29.67 | 25.21 |
| 62.5 | 84.49 | 19.04 | 16.09 |
| 63.0 | 84.52 | 8.16 | 6.90 |
| 63.5 | 84.74 | 1.86 | 1.58 |
| 64.0 | 84.60 | 2.87 | 2.43 |
| 64.5 | 83.62 | 8.46 | 7.07 |
| 65.0 | 81.86 | 13.91 | 11.38 |

BEAMSPLITTER EXAMPLE 3

Table 5 below illustrates another example of a coating interface 320 that satisfies the requirements of a flat R(s)*T(p) apodization function using a total of 26 alternating layers (n=13) of MgF$_2$ and LaF$_3$. This example provides a relatively flat R(s)*T(p) function between 40 and 60 degrees incident. In that range, the R(s)*T(p) function ranges from a maximum of 72.69% to a minimum of 71.80% or a delta of 0.89% (±0.445%).

TABLE 5

| Layer Number | Material | Mechanical Thickness (nm) | Layer Index (at 157.6 nm) | Optical Thickness (quarter-waves at 157.6 nm) |
|---|---|---|---|---|
| exit medium | CaF$_2$ | massive | | |
| 1 | MgF$_2$ | 38.09 | 1.465 | 1.416 |
| 2 | LaF$_3$ | 8.56 | 1.78 | 0.387 |
| 3 | MgF$_2$ | 40.19 | 1.465 | 1.494 |
| 4 | LaF$_3$ | 25.39 | 1.78 | 1.147 |
| 5 | MgF$_2$ | 25.43 | 1.465 | 0.946 |
| 6 | LaF$_3$ | 20.00 | 1.78 | 0.904 |
| 7 | MgF$_2$ | 29.25 | 1.465 | 1.088 |
| 8 | LaF$_3$ | 27.49 | 1.78 | 1.242 |
| 9 | MgF$_2$ | 36.72 | 1.465 | 1.365 |
| 10 | LaF$_3$ | 16.23 | 1.78 | 0.733 |
| 11 | MgF$_2$ | 27.28 | 1.465 | 1.014 |
| 12 | LaF$_3$ | 29.49 | 1.78 | 1.332 |
| 13 | MgF$_2$ | 120.76 | 1.465 | 4.490 |
| 14 | LaF$_3$ | 30.60 | 1.78 | 1.382 |
| 15 | MgF$_2$ | 38.55 | 1.465 | 1.433 |
| 16 | LaF$_3$ | 30.80 | 1.78 | 1.391 |

TABLE 5-continued

| Layer Number | Material | Mechanical Thickness (nm) | Layer Index (at 157.6 nm) | Optical Thickness (quarter-waves at 157.6 nm) |
|---|---|---|---|---|
| 17 | MgF$_2$ | 39.70 | 1.465 | 1.476 |
| 18 | LaF$_3$ | 31.34 | 1.78 | 1.416 |
| 19 | MgF$_2$ | 40.71 | 1.465 | 1.514 |
| 20 | LaF$_3$ | 30.44 | 1.78 | 1.375 |
| 21 | MgF$_2$ | 45.04 | 1.465 | 1.675 |
| 22 | LaF$_3$ | 21.30 | 1.78 | 0.962 |
| 23 | MgF$_2$ | 23.64 | 1.465 | 0.879 |
| 24 | LaF$_3$ | 8.82 | 1.78 | 0.398 |
| 25 | MgF$_2$ | 51.75 | 1.465 | 1.924 |
| 26 | LaF$_3$ | 25.88 | 1.78 | 1.169 |
| entrance medium | CaF$_2$ | massive | | |

Figure 6:
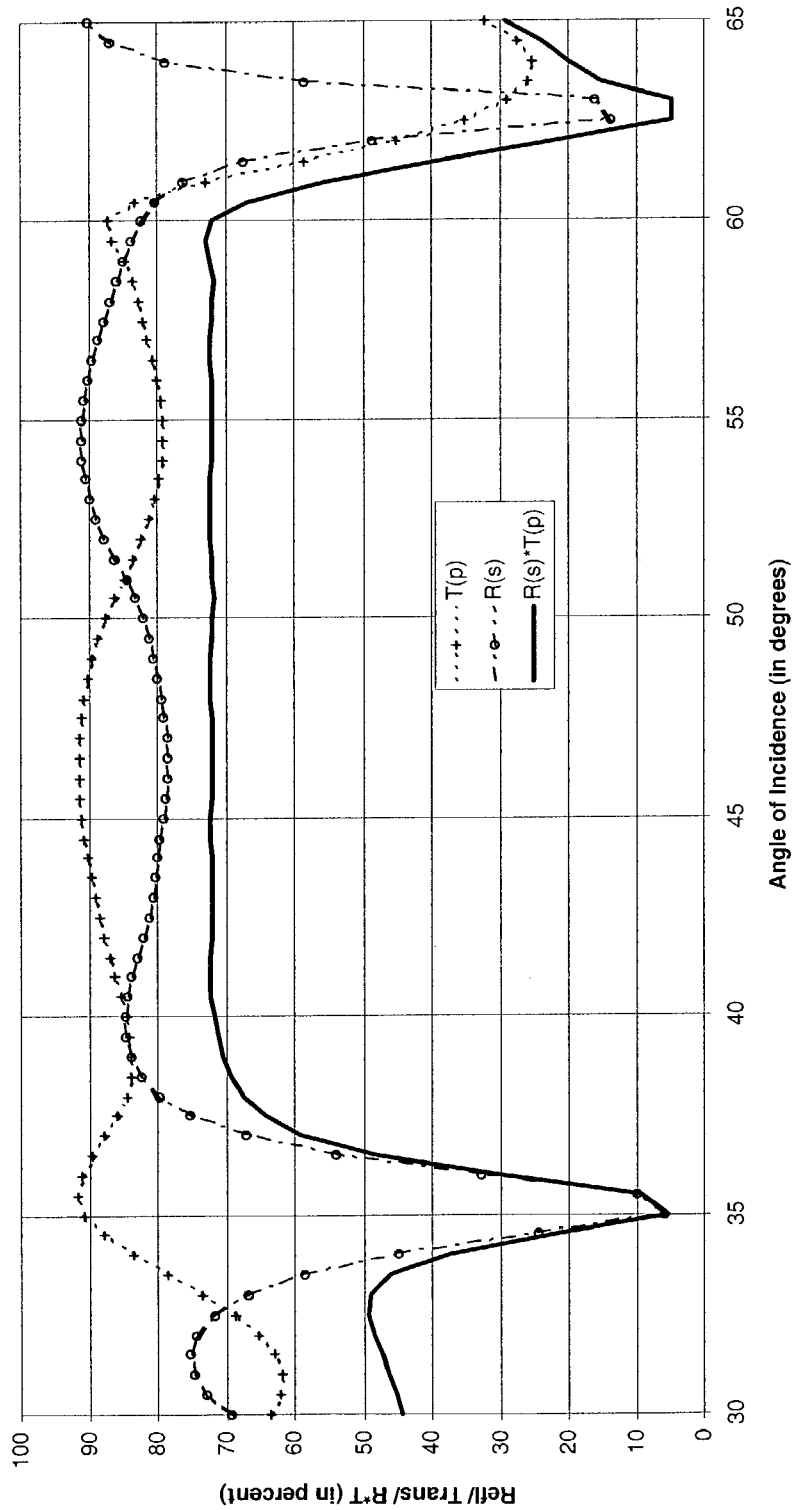

The R(s), T(p) and the overall R(s)*T(p) functions are shown in FIG. 6 in graphical form, and are illustrated in the Table 2 below in tabular form:

TABLE 6

| | Wavelength Range | 157.6 nm 40-60 degrees | |
|---|---|---|---|
| | Substrate | CaF$_2$ | |
| | H | LaF$_3$ | |
| | L | MgF$_2$ | |
| angle | T(p) | R(s) | R(s) * T(p) |
| 30.0 | 63.71 | 69.28 | 44.14 |
| 30.5 | 62.12 | 72.74 | 45.19 |
| 31.0 | 61.84 | 74.61 | 46.14 |
| 31.5 | 62.88 | 75.10 | 47.22 |
| 32.0 | 65.23 | 74.22 | 48.41 |
| 32.5 | 68.80 | 71.69 | 49.32 |
| 33.0 | 73.37 | 66.88 | 49.07 |
| 33.5 | 78.53 | 58.54 | 45.97 |
| 34.0 | 83.64 | 44.72 | 37.40 |
| 34.5 | 87.91 | 24.45 | 21.50 |
| 35.0 | 90.68 | 6.05 | 5.48 |
| 35.5 | 91.68 | 9.93 | 9.11 |
| 36.0 | 91.12 | 32.89 | 29.97 |
| 36.5 | 89.56 | 53.91 | 48.29 |
| 37.0 | 87.66 | 67.30 | 59.00 |
| 37.5 | 85.91 | 75.18 | 64.59 |
| 38.0 | 84.62 | 79.80 | 67.53 |
| 38.5 | 83.91 | 82.50 | 69.23 |
| 39.0 | 83.75 | 84.01 | 70.36 |
| 39.5 | 84.04 | 84.70 | 71.18 |
| 40.0 | 84.62 | 84.82 | 71.78 |
| 40.5 | 85.36 | 84.49 | 72.12 |
| 41.0 | 86.15 | 83.84 | 72.22 |
| 41.5 | 86.92 | 82.99 | 72.13 |
| 42.0 | 87.65 | 82.09 | 71.95 |
| 42.5 | 88.35 | 81.28 | 71.81 |
| 43.0 | 89.01 | 80.67 | 71.80 |
| 43.5 | 89.64 | 80.23 | 71.92 |
| 44.0 | 90.21 | 79.90 | 72.08 |
| 44.5 | 90.69 | 79.59 | 72.18 |
| 45.0 | 91.07 | 79.25 | 72.17 |
| 45.5 | 91.33 | 78.91 | 72.07 |
| 46.0 | 91.46 | 78.64 | 71.93 |
| 46.5 | 91.47 | 78.53 | 71.83 |
| 47.0 | 91.37 | 78.64 | 71.85 |
| 47.5 | 91.15 | 78.96 | 71.97 |
| 48.0 | 90.79 | 79.43 | 72.12 |
| 48.5 | 90.28 | 79.97 | 72.20 |
| 49.0 | 89.59 | 80.54 | 72.16 |
| 49.5 | 88.69 | 81.18 | 72.00 |
| 50.0 | 87.58 | 82.02 | 71.83 |
| 50.5 | 86.30 | 83.16 | 71.76 |
| 51.0 | 84.91 | 84.60 | 71.83 |
| 51.5 | 83.52 | 86.18 | 71.98 |
| 52.0 | 82.24 | 87.69 | 72.12 |
| 52.5 | 81.15 | 88.96 | 72.19 |

TABLE 6-continued

| | | |
|---|---|---|
| Wavelength Range | 157.6 nm | |
| | 40-60 degrees | |
| Substrate | CaF$_2$ | |
| H | LaF$_3$ | |
| L | MgF$_2$ | |

| angle | T(p) | R(s) | R(s) * T(p) |
|---|---|---|---|
| 53.0 | 80.28 | 89.92 | 72.19 |
| 53.5 | 79.63 | 90.57 | 72.13 |
| 54.0 | 79.19 | 90.94 | 72.02 |
| 54.5 | 78.97 | 91.05 | 71.90 |
| 55.0 | 78.99 | 90.93 | 71.83 |
| 55.5 | 79.29 | 90.61 | 71.84 |
| 56.0 | 79.86 | 90.10 | 71.95 |
| 56.5 | 80.62 | 89.44 | 72.10 |
| 57.0 | 81.40 | 88.66 | 72.17 |
| 57.5 | 82.07 | 87.80 | 72.05 |
| 58.0 | 82.68 | 86.89 | 71.83 |
| 58.5 | 83.52 | 85.95 | 71.78 |
| 59.0 | 84.91 | 84.98 | 72.15 |
| 59.5 | 86.63 | 83.91 | 72.69 |
| 60.0 | 87.12 | 82.49 | 71.87 |
| 60.5 | 83.25 | 80.23 | 66.79 |
| 61.0 | 72.90 | 76.04 | 55.43 |
| 61.5 | 58.52 | 67.52 | 39.51 |
| 62.0 | 45.05 | 48.70 | 21.94 |
| 62.5 | 35.16 | 13.70 | 4.82 |
| 63.0 | 29.00 | 16.06 | 4.66 |
| 63.5 | 25.91 | 58.38 | 15.12 |
| 64.0 | 25.40 | 78.80 | 20.01 |
| 64.5 | 27.46 | 86.76 | 23.82 |
| 65.0 | 32.39 | 90.12 | 29.19 |

BEAMSPLITTER EXAMPLE 4

Table 7 below illustrates another example of a coating interface 320 that satisfies the requirements of a flat R(s)*T(p) apodization function using a total of 32 alternating layers (n=16) of AlF$_3$ and NdF$_3$. This example provides a relatively flat R(s)*T(p) function between 35 and 55 degrees incident. In that range, the R(s)*T(p) function ranges from a maximum of 72.55% to a minimum 71.24%, or a delta of 1.31% (±0.655%).

TABLE 7

| Layer Number | Material | Mechanical Thickness (nm) | Layer Index (at 157.6 nm) | Optical Thickness (quarter-waves at 157.6 nm) |
|---|---|---|---|---|
| exit medium | CaF$_2$ | massive | | |
| 1 | NdF$_3$ | 28.95 | 1.7 | 1.0200 |
| 2 | AlF$_3$ | 39.10 | 1.417 | 1.1483 |
| 3 | NdF$_3$ | 24.88 | 1.7 | 0.8766 |
| 4 | AlF$_3$ | 39.09 | 1.417 | 1.1480 |
| 5 | NdF$_3$ | 28.67 | 1.7 | 1.0101 |
| 6 | AlF$_3$ | 38.99 | 1.417 | 1.1451 |
| 7 | NdF$_3$ | 23.93 | 1.7 | 0.8431 |
| 8 | AlF$_3$ | 35.48 | 1.417 | 1.0420 |
| 9 | NdF$_3$ | 28.67 | 1.7 | 1.0101 |
| 10 | AlF$_3$ | 44.86 | 1.417 | 1.3174 |
| 11 | NdF$_3$ | 35.18 | 1.7 | 1.2395 |
| 12 | AlF$_3$ | 46.91 | 1.417 | 1.3776 |
| 13 | NdF$_3$ | 36.51 | 1.7 | 1.2864 |
| 14 | AlF$_3$ | 48.21 | 1.417 | 1.4158 |
| 15 | NdF$_3$ | 37.64 | 1.7 | 1.3262 |
| 16 | AlF$_3$ | 50.12 | 1.417 | 1.4719 |
| 17 | NdF$_3$ | 38.90 | 1.7 | 1.3706 |
| 18 | AlF$_3$ | 53.67 | 1.417 | 1.5762 |
| 19 | NdF$_3$ | 41.69 | 1.7 | 1.4689 |
| 20 | AlF$_3$ | 95.59 | 1.417 | 2.8073 |
| 21 | NdF$_3$ | 48.10 | 1.7 | 1.6947 |
| 22 | AlF$_3$ | 55.92 | 1.417 | 1.6423 |

TABLE 7-continued

| Layer Number | Material | Mechanical Thickness (nm) | Layer Index (at 157.6 nm) | Optical Thickness (quarter-waves at 157.6 nm) |
|---|---|---|---|---|
| 23 | NdF$_3$ | 40.70 | 1.7 | 1.4340 |
| 24 | AlF$_3$ | 126.79 | 1.417 | 3.7236 |
| 25 | NdF$_3$ | 30.49 | 1.7 | 1.0743 |
| 26 | AlF$_3$ | 46.76 | 1.417 | 1.3732 |
| 27 | NdF$_3$ | 23.50 | 1.7 | 0.8280 |
| 28 | AlF$_3$ | 42.27 | 1.417 | 1.2414 |
| 29 | NdF$_3$ | 26.20 | 1.7 | 0.9231 |
| 30 | AlF$_3$ | 42.51 | 1.417 | 1.2484 |
| 31 | NdF$_3$ | 17.93 | 1.7 | 0.6317 |
| 32 | AlF$_3$ | 140.21 | 1.417 | 4.1177 |
| entrance medium | CaF$_2$ | massive | | |

Figure 7:
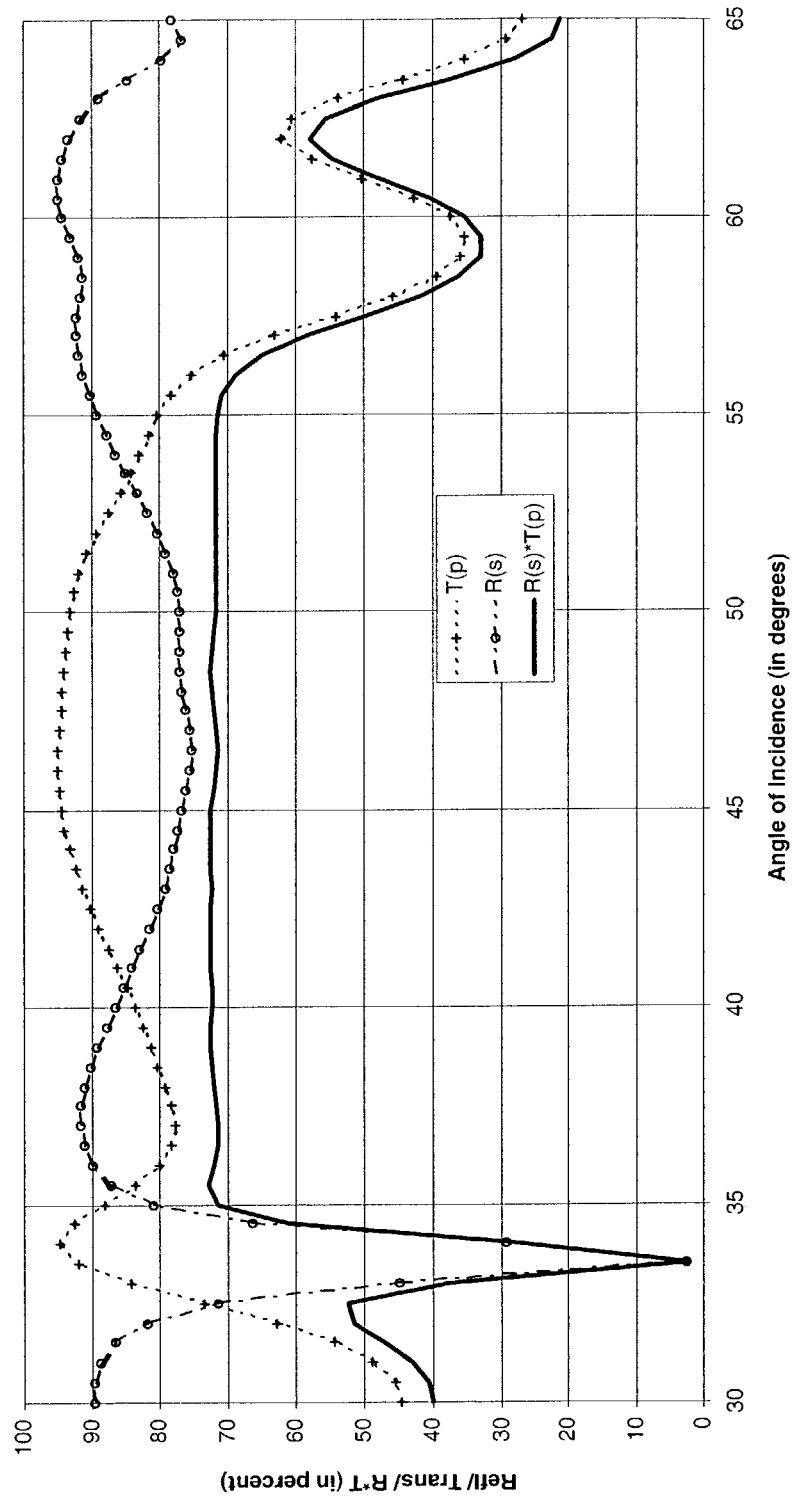

The R(s), T(p) and the overall R(s)*T(p) functions are shown in FIG. 7 in graphical form, and are illustrated in the Table 8 below in tabular form:

TABLE 8

| | | |
|---|---|---|
| Wavelength | 193 nm | |
| Range | 35-55 degrees | |
| Substrate | CaF$_2$ | |
| H | NdF$_3$ | |
| L | AlF$_3$ | |

| angle | T(p) | R(s) | R(s) * T(p) |
|---|---|---|---|
| 30.0 | 44.49 | 89.57 | 39.85 |
| 30.5 | 45.29 | 89.66 | 40.60 |
| 31.0 | 48.52 | 88.81 | 43.08 |
| 31.5 | 54.32 | 86.62 | 47.06 |
| 32.0 | 62.78 | 81.91 | 51.42 |
| 32.5 | 73.33 | 71.24 | 52.24 |
| 33.0 | 84.11 | 44.86 | 37.73 |
| 33.5 | 92.02 | 2.27 | 2.09 |
| 34.0 | 94.70 | 29.38 | 27.83 |
| 34.5 | 92.54 | 66.24 | 61.30 |
| 35.0 | 88.02 | 81.04 | 71.33 |
| 35.5 | 83.48 | 87.12 | 72.73 |
| 36.0 | 80.13 | 89.90 | 72.03 |
| 36.5 | 78.27 | 91.18 | 71.37 |
| 37.0 | 77.73 | 91.65 | 71.24 |
| 37.5 | 78.13 | 91.58 | 71.55 |
| 38.0 | 79.05 | 91.09 | 72.01 |
| 38.5 | 80.17 | 90.26 | 72.36 |
| 39.0 | 81.30 | 89.15 | 72.48 |
| 39.5 | 82.43 | 87.88 | 72.44 |
| 40.0 | 83.58 | 86.58 | 72.36 |
| 40.5 | 84.81 | 85.34 | 72.37 |
| 41.0 | 86.13 | 84.13 | 72.46 |
| 41.5 | 87.50 | 82.90 | 72.54 |
| 42.0 | 88.87 | 81.61 | 72.53 |
| 42.5 | 90.17 | 80.34 | 72.44 |
| 43.0 | 91.35 | 79.22 | 72.37 |
| 43.5 | 92.37 | 78.38 | 72.39 |
| 44.0 | 93.21 | 77.78 | 72.50 |
| 44.5 | 93.88 | 77.28 | 72.55 |
| 45.0 | 94.38 | 76.71 | 72.41 |
| 45.5 | 94.71 | 76.07 | 72.04 |
| 46.0 | 94.87 | 75.51 | 71.63 |
| 46.5 | 94.85 | 75.30 | 71.43 |
| 47.0 | 94.70 | 75.56 | 71.56 |
| 47.5 | 94.47 | 76.13 | 71.91 |
| 48.0 | 94.21 | 76.70 | 72.26 |
| 48.5 | 93.98 | 77.05 | 72.41 |
| 49.0 | 93.76 | 77.10 | 72.30 |
| 49.5 | 93.52 | 77.01 | 72.02 |
| 50.0 | 93.17 | 77.01 | 71.75 |
| 50.5 | 92.62 | 77.32 | 71.61 |
| 51.0 | 91.80 | 78.01 | 71.61 |
| 51.5 | 90.64 | 79.04 | 71.63 |
| 52.0 | 89.16 | 80.32 | 71.61 |
| 52.5 | 87.49 | 81.80 | 71.56 |

TABLE 8-continued

| | Wavelength | 193 nm |
|---|---|---|
| | Range | 35-55 degrees |
| | Substrate | CaF$_2$ |
| | H | NdF$_3$ |
| | L | AlF$_3$ |

| angle | T(p) | R(s) | R(s) * T(p) |
|---|---|---|---|
| 53.0 | 85.80 | 83.39 | 71.55 |
| 53.5 | 84.26 | 84.97 | 71.60 |
| 54.0 | 82.90 | 86.48 | 71.69 |
| 54.5 | 81.61 | 87.87 | 71.71 |
| 55.0 | 80.20 | 89.14 | 71.49 |
| 55.5 | 78.33 | 90.27 | 70.71 |
| 56.0 | 75.36 | 91.20 | 68.73 |
| 56.5 | 70.40 | 91.87 | 64.68 |
| 57.0 | 63.00 | 92.21 | 58.10 |
| 57.5 | 54.11 | 92.16 | 49.87 |
| 58.0 | 45.72 | 91.74 | 41.94 |
| 58.5 | 39.42 | 91.35 | 36.01 |
| 59.0 | 35.88 | 91.88 | 32.96 |
| 59.5 | 35.19 | 93.20 | 32.79 |
| 60.0 | 37.40 | 94.28 | 35.26 |
| 60.5 | 42.56 | 94.80 | 40.35 |
| 61.0 | 50.07 | 94.83 | 47.49 |
| 61.5 | 57.74 | 94.41 | 54.52 |
| 62.0 | 62.06 | 93.47 | 58.01 |
| 62.5 | 60.65 | 91.77 | 55.66 |
| 63.0 | 53.77 | 88.93 | 47.82 |
| 63.5 | 44.08 | 84.65 | 37.31 |
| 64.0 | 35.18 | 79.69 | 28.03 |
| 64.5 | 29.30 | 76.59 | 22.44 |
| 65.0 | 26.97 | 78.20 | 21.09 |

BEAMSPLITTER EXAMPLE 5

Table 9 below illustrates another example of a coating interface 320 for 193 nm that satisfies the requirements of a flat R(s)*T(p) apodization function using a total of 30 alternating layers (n=15) of AlF$_3$ and NdF$_3$. This example provides a relatively flat R(s)*T(p) function between 35 and 55 degrees incident. In that range, the R(s)*T(p) function ranges from a maximum 74.60% to a minimum of 70.38%, or a delta of 4.33$ (±2.11%).

TABLE 9

| Layer Number | Material | Mechanical Thickness (nm) | Layer Index (at 157.6 nm) | Optical Thickness (quarter-waves at 157.6 nm) |
|---|---|---|---|---|
| exit medium | fused silica | massive | | |
| 1 | NdF$_3$ | 26.46 | 1.7 | 0.9323 |
| 2 | AlF$_3$ | 23.86 | 1.417 | 0.7007 |
| 3 | NdF$_3$ | 33.23 | 1.7 | 1.1708 |
| 4 | AlF$_3$ | 44.51 | 1.417 | 1.3072 |
| 5 | NdF$_3$ | 27.74 | 1.7 | 0.9774 |
| 6 | AlF$_3$ | 27.66 | 1.417 | 0.8123 |
| 7 | NdF$_3$ | 31.81 | 1.7 | 1.1208 |
| 8 | AlF$_3$ | 58.21 | 1.417 | 1.7095 |
| 9 | NdF$_3$ | 4.19 | 1.7 | 0.1476 |
| 10 | AlF$_3$ | 49.37 | 1.417 | 1.4499 |
| 11 | NdF$_3$ | 39.27 | 1.7 | 1.3836 |
| 12 | AlF$_3$ | 43.00 | 1.417 | 1.2628 |
| 13 | NdF$_3$ | 40.45 | 1.7 | 1.4252 |
| 14 | AlF$_3$ | 43.96 | 1.417 | 1.2910 |
| 15 | NdF$_3$ | 41.24 | 1.7 | 1.4530 |
| 16 | AlF$_3$ | 44.88 | 1.417 | 1.3180 |
| 17 | NdF$_3$ | 41.57 | 1.7 | 1.4646 |
| 18 | AlF$_3$ | 45.85 | 1.417 | 1.3465 |
| 19 | NdF$_3$ | 42.57 | 1.7 | 1.4999 |
| 20 | AlF$_3$ | 65.98 | 1.417 | 1.9377 |
| 21 | NdF$_3$ | 70.52 | 1.7 | 2.4846 |
| 22 | AlF$_3$ | 60.70 | 1.417 | 1.7826 |
| 23 | NdF$_3$ | 41.06 | 1.7 | 1.4467 |
| 24 | AlF$_3$ | 122.77 | 1.417 | 3.6055 |
| 25 | NdF$_3$ | 51.95 | 1.7 | 1.8304 |
| 26 | AlF$_3$ | 40.83 | 1.417 | 1.1991 |
| 27 | NdF$_3$ | 7.85 | 1.7 | 0.2766 |
| 28 | AlF$_3$ | 61.42 | 1.417 | 1.8038 |
| 29 | NdF$_3$ | 96.34 | 1.7 | 3.3944 |
| 30 | AlF$_3$ | 123.13 | 1.417 | 3.6161 |
| entrance medium | fused silica | massive | | |

Figure 8:
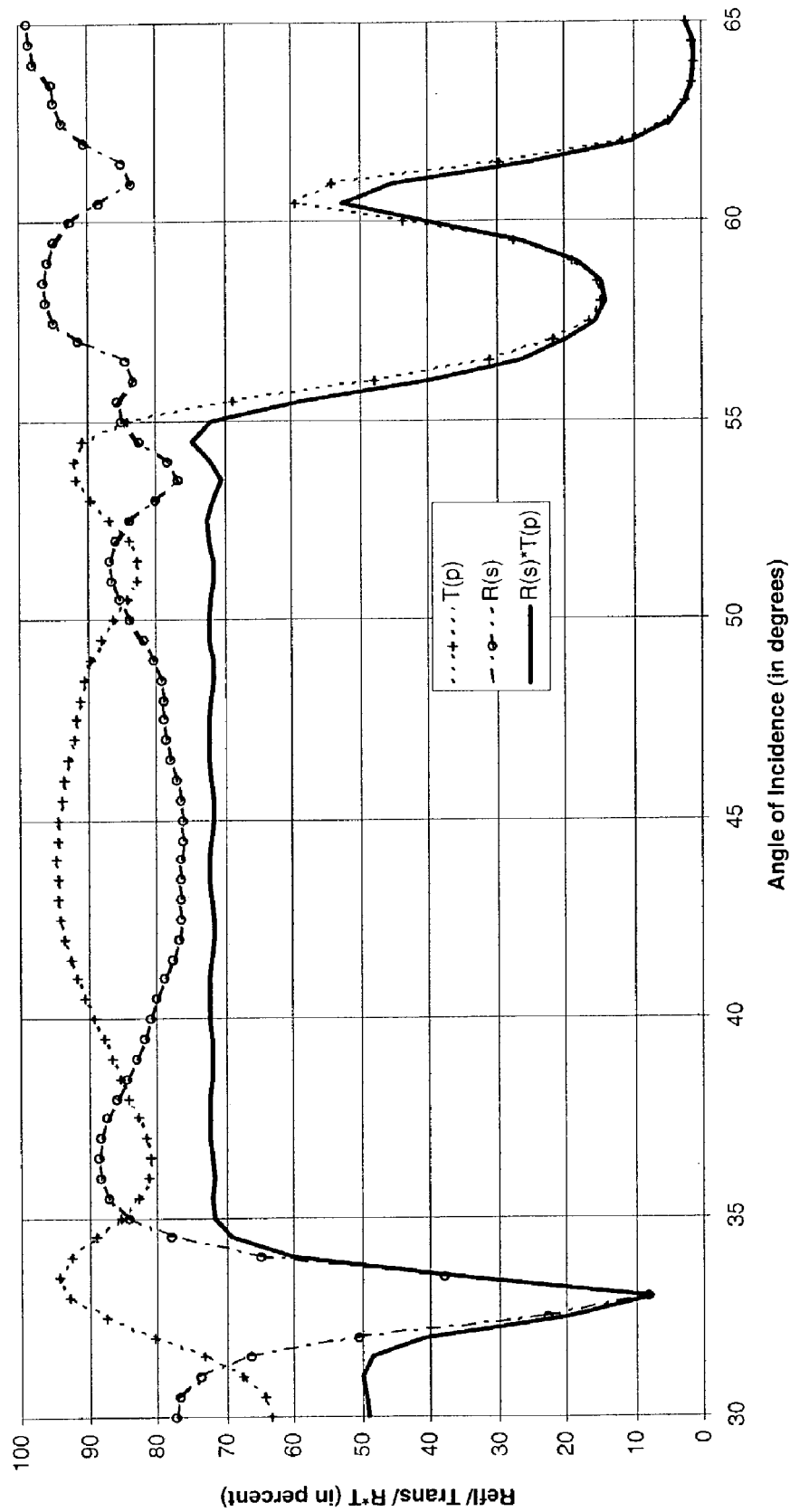

The R(s), T(p) and the overall R(s)*T(p) functions are shown in FIG. 8 in graphical form, and are illustrated in the Table 10 below in tabular form:

TABLE 10

| | Wavelength | 193 nm |
|---|---|---|
| | Range | 35-55 degrees |
| | Substrate | fused silica |
| | H | NdF$_3$ |
| | L | AlF$_3$ |

| angle | T(p) | R(s) | R(s) * T(p) |
|---|---|---|---|
| 30.0 | 63.31 | 77.30 | 48.94 |
| 30.5 | 64.24 | 76.82 | 49.35 |
| 31.0 | 67.59 | 73.70 | 49.81 |
| 31.5 | 73.17 | 66.26 | 48.48 |
| 32.0 | 80.32 | 50.57 | 40.62 |
| 32.5 | 87.57 | 22.59 | 19.79 |
| 33.0 | 92.81 | 8.04 | 7.46 |
| 33.5 | 94.47 | 37.85 | 35.76 |
| 34.0 | 92.68 | 64.77 | 60.03 |
| 34.5 | 89.04 | 77.91 | 69.37 |
| 35.0 | 85.31 | 84.09 | 71.74 |
| 35.5 | 82.57 | 87.09 | 71.91 |
| 36.0 | 81.16 | 88.44 | 71.77 |
| 36.5 | 80.96 | 88.78 | 71.88 |
| 37.0 | 81.63 | 88.39 | 72.15 |
| 37.5 | 82.76 | 87.41 | 72.34 |
| 38.0 | 84.03 | 86.00 | 72.27 |
| 38.5 | 85.31 | 84.40 | 72.00 |
| 39.0 | 86.56 | 82.95 | 71.80 |
| 39.5 | 87.83 | 81.82 | 71.87 |
| 40.0 | 89.14 | 80.89 | 72.11 |
| 40.5 | 90.43 | 79.93 | 72.28 |
| 41.0 | 91.62 | 78.83 | 72.23 |
| 41.5 | 92.63 | 77.71 | 71.98 |
| 42.0 | 93.40 | 76.84 | 71.76 |
| 42.5 | 93.94 | 76.42 | 71.79 |
| 43.0 | 94.27 | 76.41 | 72.03 |
| 43.5 | 94.44 | 76.50 | 72.25 |
| 44.0 | 94.50 | 76.45 | 72.24 |
| 44.5 | 94.43 | 76.26 | 72.01 |
| 45.0 | 94.23 | 76.15 | 71.75 |
| 45.5 | 93.85 | 76.40 | 71.71 |
| 46.0 | 93.32 | 77.04 | 71.90 |
| 46.5 | 92.70 | 77.83 | 72.15 |
| 47.0 | 92.09 | 78.45 | 72.24 |
| 47.5 | 91.52 | 78.78 | 72.10 |
| 48.0 | 91.00 | 78.92 | 71.81 |
| 48.5 | 90.38 | 79.25 | 71.63 |
| 49.0 | 89.48 | 80.19 | 71.75 |
| 49.5 | 88.11 | 81.82 | 72.09 |
| 50.0 | 86.26 | 83.77 | 72.27 |
| 50.5 | 84.28 | 85.50 | 72.06 |
| 51.0 | 82.80 | 86.62 | 71.72 |
| 51.5 | 82.57 | 86.88 | 71.73 |
| 52.0 | 83.99 | 86.04 | 72.26 |
| 52.5 | 86.74 | 83.77 | 72.66 |
| 53.0 | 89.69 | 80.03 | 71.78 |

TABLE 10-continued

| | | | |
|---|---|---|---|
| Wavelength | 193 nm | | |
| Range | 35-55 degrees | | |
| Substrate | fused silica | | |
| H | NdF$_3$ | | |
| L | AlF$_3$ | | |
| angle | T(p) | R(s) | R(s) * T(p) |
| 53.5 | 91.59 | 76.84 | 70.38 |
| 54.0 | 92.04 | 78.08 | 71.86 |
| 54.5 | 90.69 | 82.25 | 74.60 |
| 55.0 | 84.32 | 85.21 | 71.85 |
| 55.5 | 68.51 | 85.56 | 58.62 |
| 56.0 | 47.66 | 83.36 | 39.73 |
| 56.5 | 31.16 | 84.45 | 26.31 |
| 57.0 | 21.39 | 91.43 | 19.56 |
| 57.5 | 16.45 | 94.99 | 15.63 |
| 58.0 | 14.61 | 96.15 | 14.04 |
| 58.5 | 15.24 | 96.33 | 14.68 |
| 59.0 | 18.89 | 95.92 | 18.12 |
| 59.5 | 27.56 | 94.84 | 26.13 |
| 60.0 | 43.58 | 92.61 | 40.36 |
| 60.5 | 59.39 | 88.45 | 52.53 |
| 61.0 | 54.07 | 83.58 | 45.19 |
| 61.5 | 29.58 | 84.97 | 25.13 |
| 62.0 | 11.69 | 90.40 | 10.57 |
| 62.5 | 4.76 | 93.82 | 4.47 |
| 63.0 | 2.36 | 94.86 | 2.24 |
| 63.5 | 1.49 | 95.34 | 1.42 |
| 64.0 | 1.21 | 97.88 | 1.19 |
| 64.5 | 1.35 | 98.57 | 1.33 |
| 65.0 | 2.33 | 98.89 | 2.30 |

BEAMSPLITTER EXAMPLE 6

Table 11 below illustrates another example of a coating interface 320 for 157.6 nm that satisfies the requirements of a flat R(s)*T(p) apodization function using a total of 21 alternating layers of LaF$_3$ and MgF$_2$. This example provides a relatively flat R(s)*T(p) function between 44 and 60 degrees incident. In that range, the R(s)*T(p) function ranges from a maximum 68.08% to a minimum of 67.95%, or a delta of 0.128% (±0.064%).

TABLE 11

| | Material | Index of refraction (at 157.6) | Thickness (nm) |
|---|---|---|---|
| Exit medium | CaF$_2$ | 1.558 | massive |
| Layer 1 | LaF$_3$ | 1.78 | 6.58 |
| Layer 2 | MgF$_2$ | 1.465 | 26.99 |
| Layer 3 | LaF$_3$ | 1.78 | 26.67 |
| Layer 4 | MgF$_2$ | 1.465 | 13.76 |
| Layer 5 | LaF$_3$ | 1.78 | 43.26 |
| Layer 6 | MgF$_2$ | 1.465 | 15.96 |
| Layer 7 | LaF$_3$ | 1.78 | 26.76 |
| Layer 8 | MgF$_2$ | 1.465 | 22.79 |
| Layer 9 | LaF$_3$ | 1.78 | 30.06 |
| Layer 10 | MgF$_2$ | 1.465 | 21.23 |
| Layer 11 | LaF$_3$ | 1.78 | 41.81 |
| Layer 12 | MgF$_2$ | 1.465 | 30.49 |
| Layer 13 | LaF$_3$ | 1.78 | 39.32 |
| Layer 14 | MgF$_2$ | 1.465 | 30.48 |
| Layer 15 | LaF$_3$ | 1.78 | 40.11 |
| Layer 16 | MgF$_2$ | 1.465 | 31.22 |
| Layer 17 | LaF$_3$ | 1.78 | 47.42 |
| Layer 18 | MgF$_2$ | 1.465 | 20.04 |
| Layer 19 | LaF$_3$ | 1.78 | 28.12 |
| Layer 20 | MgF$_2$ | 1.465 | 89.08 |
| Layer 21 | LaF$_3$ | 1.78 | 45.99 |
| Entrance medium | CaF$_2$ | 1.558 | massive |

Figure 9:
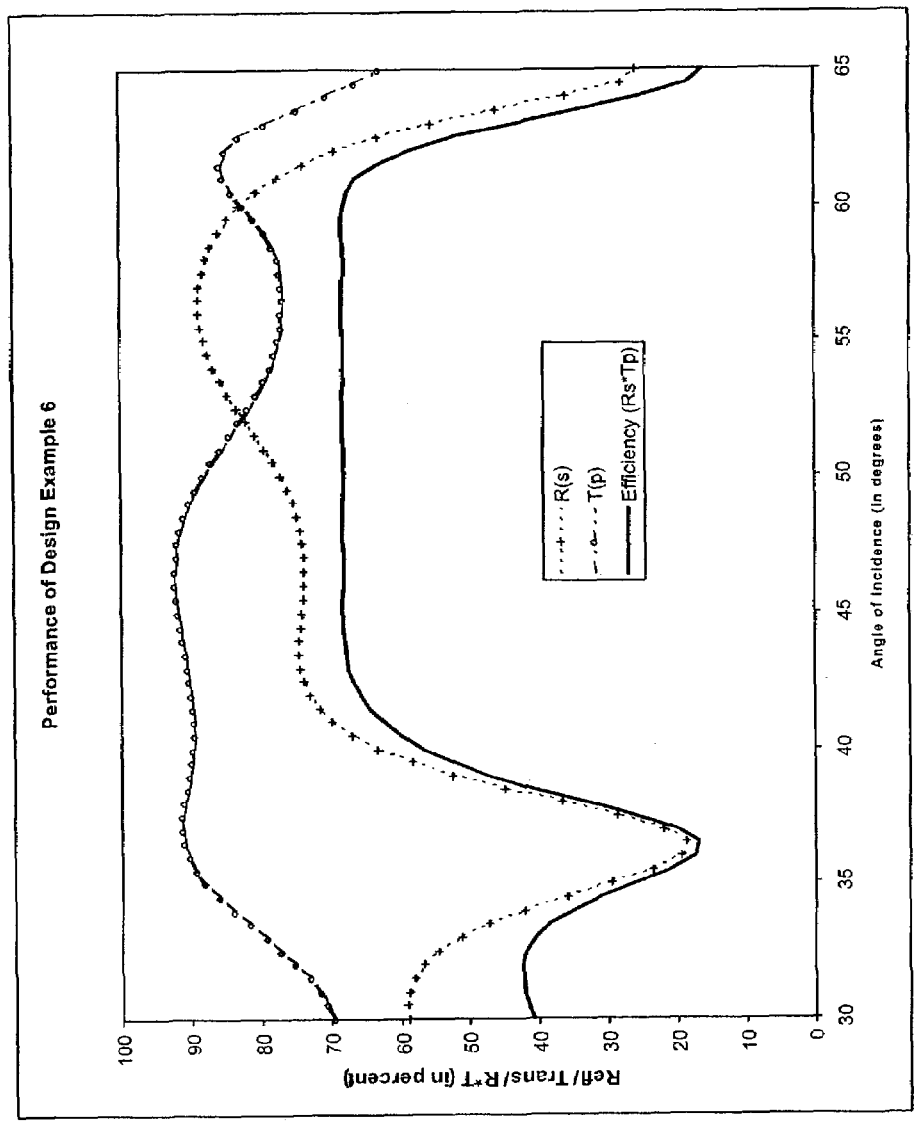

The R(s), T(p) and the overall R(s)*T(p) functions are shown in FIG. 9 in graphical form, and are illustrated in the Table 12 below in tabular form:

TABLE 12

| | | | |
|---|---|---|---|
| Wavelength | 157.6 nm | | |
| Range | 44-60 degrees | | |
| Substrate | CaF$_2$ | | |
| H | LaF$_3$ | | |
| L | MgF$_2$ | | |
| Angle | R(s) | T(p) | Efficiency (Rs * Tp) |
| 30 | 58.9139 | 69.5322 | 40.96413078 |
| 30.5 | 59.2118 | 70.3769 | 41.67142927 |
| 31 | 58.9692 | 71.5766 | 42.20814841 |
| 31.5 | 58.1352 | 73.1124 | 42.50403996 |
| 32 | 56.6385 | 74.9485 | 42.44970617 |
| 32.5 | 54.387 | 77.0295 | 41.89403417 |
| 33 | 51.2722 | 79.278 | 40.64757472 |
| 33.5 | 47.1894 | 81.5955 | 38.50442688 |
| 34 | 42.0867 | 83.8674 | 35.29702104 |
| 34.5 | 36.0681 | 85.9728 | 31.00875548 |
| 35 | 29.5641 | 87.7991 | 25.95701372 |
| 35.5 | 23.5225 | 89.2587 | 20.99587771 |
| 36 | 19.4119 | 90.3033 | 17.52958629 |
| 36.5 | 18.7295 | 90.9307 | 17.03086546 |
| 37 | 22.0851 | 91.1835 | 20.13796716 |
| 37.5 | 28.6865 | 91.1384 | 26.14441712 |
| 38 | 36.8679 | 90.8907 | 33.50949239 |
| 38.5 | 45.0672 | 90.5386 | 40.80321194 |
| 39 | 52.3501 | 90.1693 | 47.20371872 |
| 39.5 | 58.3732 | 89.851 | 52.44890393 |
| 40 | 63.1419 | 89.6287 | 56.59326413 |
| 40.5 | 66.8075 | 89.5251 | 59.80948118 |
| 41 | 69.5546 | 89.5433 | 62.28148414 |
| 41.5 | 71.5537 | 89.6718 | 64.16349076 |
| 42 | 72.9471 | 89.8899 | 65.57207524 |
| 42.5 | 73.851 | 90.1731 | 66.59373608 |
| 43 | 74.3622 | 90.4966 | 67.29526269 |
| 43.5 | 74.5655 | 90.8379 | 67.73373432 |
| 44 | 74.5416 | 91.1777 | 67.96531642 |
| 44.5 | 74.3703 | 91.4985 | 68.04770895 |
| 45 | 74.1315 | 91.7828 | 68.03996638 |
| 45.5 | 73.9005 | 92.0117 | 67.99710636 |
| 46 | 73.7397 | 92.1631 | 67.96079345 |
| 46.5 | 73.6918 | 92.2131 | 67.95349323 |
| 47 | 73.7764 | 92.1366 | 67.97506656 |
| 47.5 | 73.9948 | 91.9112 | 68.00950862 |
| 48 | 74.3402 | 91.5192 | 68.03555632 |
| 48.5 | 74.8088 | 90.9504 | 68.03890284 |
| 49 | 75.4066 | 90.2031 | 68.0190908 |
| 49.5 | 76.1483 | 89.2848 | 67.98885736 |
| 50 | 77.0487 | 88.2121 | 67.96627629 |
| 50.5 | 78.1109 | 87.01 | 67.96429409 |
| 51 | 79.3161 | 85.712 | 67.98341563 |
| 51.5 | 80.6216 | 84.3595 | 68.01197865 |
| 52 | 81.9672 | 83.0007 | 68.03334777 |
| 52.5 | 83.2877 | 81.6874 | 68.03555665 |
| 53 | 84.5248 | 80.4707 | 68.01769823 |
| 53.5 | 85.6345 | 79.3955 | 67.98993945 |
| 54 | 86.5885 | 78.4947 | 67.96738331 |
| 54.5 | 87.3719 | 77.7853 | 67.96249453 |
| 55 | 87.9786 | 77.267 | 67.97842486 |
| 55.5 | 88.4071 | 76.9249 | 68.00707327 |
| 56 | 88.6567 | 76.7374 | 68.03284651 |
| 56.5 | 88.7245 | 76.6865 | 68.03971369 |
| 57 | 88.6036 | 76.7707 | 68.02160395 |
| 57.5 | 88.2817 | 77.0131 | 67.9884739 |
| 58 | 87.7394 | 77.4623 | 67.96495725 |
| 58.5 | 86.9495 | 78.1816 | 67.97851029 |
| 59 | 85.8754 | 79.2247 | 68.03452802 |
| 59.5 | 84.4685 | 80.5999 | 68.08152653 |
| 60 | 82.6643 | 82.2249 | 67.97063801 |
| 60.5 | 80.3745 | 83.8828 | 67.42038109 |
| 61 | 77.4752 | 85.2016 | 66.01011 |
| 61.5 | 73.7899 | 85.6985 | 63.23683745 |
| 62 | 69.0744 | 84.9216 | 58.65908567 |
| 62.5 | 63.0206 | 82.6559 | 52.09024412 |

TABLE 12-continued

| | Wavelength | 157.6 nm | |
|---|---|---|---|
| | Range | 44-60 degrees | |
| | Substrate | CaF$_2$ | |
| | H | LaF$_3$ | |
| | L | MgF$_2$ | |

| Angle | R(s) | T(p) | Efficiency (Rs * Tp) |
|---|---|---|---|
| 63 | 55.3373 | 79.0697 | 43.7550371 |
| 63.5 | 46.0352 | 74.6757 | 34.37710785 |
| 64 | 36.0758 | 70.1277 | 25.2991288 |
| 64.5 | 28.1251 | 65.998 | 18.5620035 |
| 65 | 25.8553 | 62.6575 | 16.2002846 |
| P-V (44-60) | | | 0.128033306 |

BEAMSPLITTER EXAMPLE 7

Table 13 below illustrates another example of a coating interface 320 for 157.6 nm that satisfies the requirements of a flat R(s)*T(p) apodization function using a total of 11 alternating layers of LaF$_3$ and MgF$_2$. This example provides a relatively flat R(s)*T(p) function between 44 and 60 degrees incident. In that range, the R(s)*T(p) function ranges from a maximum 63.11% to a minimum of 62.897%, or a delta of 0.21% (±0.1%).

TABLE 13

| | Material | Index of refraction (at 157.6) | Thickness (nm) |
|---|---|---|---|
| Exit medium | CaF$_2$ | 1.558 | massive |
| Layer 1 | LaF$_3$ | 1.78 | 58.48 |
| Layer 2 | MgF$_2$ | 1.465 | 60.07 |
| Layer 3 | LaF$_3$ | 1.78 | 55.11 |
| Layer 4 | MgF$_2$ | 1.465 | 47.98 |
| Layer 5 | LaF$_3$ | 1.78 | 31.71 |
| Layer 6 | MgF$_2$ | 1.465 | 40.26 |
| Layer 7 | LaF$_3$ | 1.78 | 31 |
| Layer 8 | MgF$_2$ | 1.465 | 38.79 |
| Layer 9 | LaF$_3$ | 1.78 | 27.29 |
| Layer 10 | MgF$_2$ | 1.465 | 37.73 |
| Layer 11 | LaF$_3$ | 1.78 | 65.71 |
| Entrance medium | CaF$_2$ | 1.558 | massive |

Figure 10:
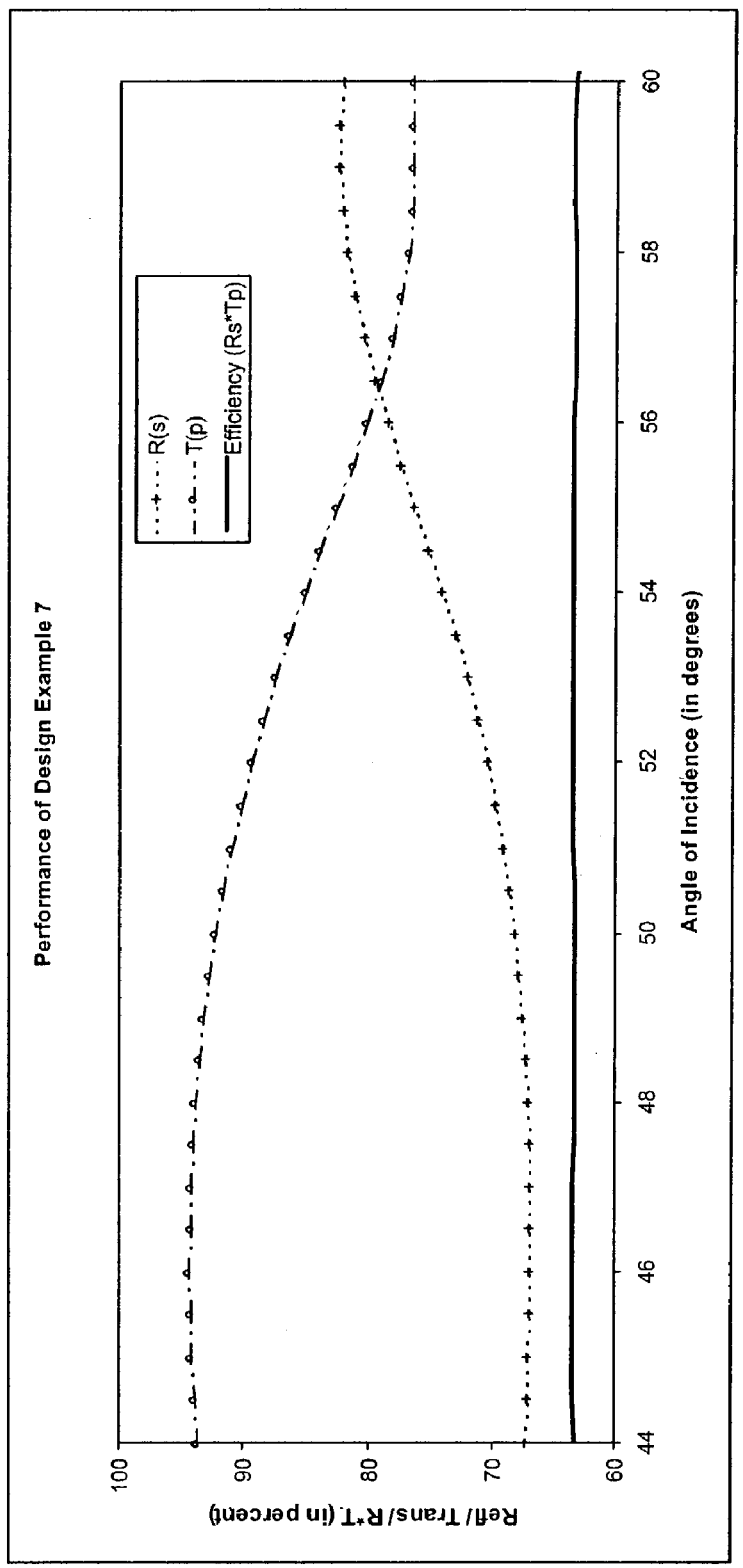

The R(s), T(p) and the overall R(s)*T(p) functions are shown in FIG. 10 in graphical form, and are illustrated in the Table 14 below in tabular form:

TABLE 14

| | Wavelength | 157.6 nm | |
|---|---|---|---|
| | Range | 44-60 degrees | |
| | Substrate | CaF$_2$ | |
| | H | LaF$_3$ | |
| | L | MgF$_2$ | |

| Angle | R(s) | T(p) | Efficiency (Rs * Tp) |
|---|---|---|---|
| 30 | 4.2925 | 94.1131 | 4.039804818 |
| 30.5 | 4.9315 | 94.151 | 4.643056565 |
| 31 | 6.2593 | 94.054 | 5.887122022 |
| 31.5 | 8.34 | 93.8199 | 7.82457966 |
| 32 | 11.1766 | 93.4551 | 10.44510271 |
| 32.5 | 14.7035 | 92.9743 | 13.6704762 |
| 33 | 18.7935 | 92.3995 | 17.36510003 |
| 33.5 | 23.2756 | 91.7586 | 21.3573647 |
| 34 | 27.9613 | 91.0837 | 25.46818661 |
| 34.5 | 32.6691 | 90.4083 | 29.53557794 |
| 35 | 37.2438 | 89.7656 | 33.43212053 |
| 35.5 | 41.5667 | 89.1865 | 37.0718849 |
| 36 | 45.5572 | 88.698 | 40.40832526 |
| 36.5 | 49.1694 | 88.3219 | 43.4273483 |
| 37 | 52.385 | 88.0741 | 46.13761729 |
| 37.5 | 55.2061 | 87.9641 | 48.56154901 |
| 38 | 57.6482 | 87.9947 | 50.72736065 |
| 38.5 | 59.7349 | 88.1623 | 52.66366174 |
| 39 | 61.4939 | 88.457 | 54.39565912 |
| 39.5 | 62.9544 | 88.8633 | 55.94335734 |
| 40 | 64.1456 | 89.3609 | 57.32108547 |
| 40.5 | 65.0956 | 89.9258 | 58.53773906 |
| 41 | 65.8314 | 90.5318 | 59.59835139 |
| 41.5 | 66.3789 | 91.1519 | 60.50562855 |
| 42 | 66.7633 | 91.76 | 61.26200408 |
| 42.5 | 67.0091 | 92.3328 | 61.87137828 |
| 43 | 67.1408 | 92.8507 | 62.34070279 |
| 43.5 | 67.1827 | 93.2989 | 62.68072009 |
| 44 | 67.1593 | 93.668 | 62.90677312 |
| 44.5 | 67.0943 | 93.9534 | 63.03737606 |
| 45 | 67.0105 | 94.1549 | 63.09366926 |
| 45.5 | 66.929 | 94.2753 | 63.09751554 |
| 46 | 66.8681 | 94.3193 | 63.06952384 |
| 46.5 | 66.8428 | 94.2921 | 63.02747982 |
| 47 | 66.8641 | 94.1984 | 62.98491237 |
| 47.5 | 66.9396 | 94.0412 | 62.95080312 |
| 48 | 67.0734 | 93.8216 | 62.92933705 |
| 48.5 | 67.2673 | 93.5386 | 62.92089068 |
| 49 | 67.522 | 93.1893 | 62.92327915 |
| 49.5 | 67.8382 | 92.769 | 62.93281976 |
| 50 | 68.218 | 92.2721 | 62.94618118 |
| 50.5 | 68.6649 | 91.6927 | 62.96070076 |
| 51 | 69.1845 | 91.0251 | 62.97526031 |
| 51.5 | 69.7837 | 90.2651 | 62.99032659 |
| 52 | 70.4695 | 89.4101 | 63.00685042 |
| 52.5 | 71.2471 | 88.4607 | 63.02568339 |
| 53 | 72.118 | 87.421 | 63.04627678 |
| 53.5 | 73.0774 | 86.3001 | 63.06586928 |
| 54 | 74.1132 | 85.1126 | 63.07967146 |
| 54.5 | 75.205 | 83.8797 | 63.08172839 |
| 55 | 76.3256 | 82.6292 | 63.06723268 |
| 55.5 | 77.4426 | 81.3954 | 63.03471404 |
| 56 | 78.5213 | 80.2182 | 62.98837348 |
| 56.5 | 79.5277 | 79.1413 | 62.93925564 |
| 57 | 80.4303 | 78.2084 | 62.90325075 |
| 57.5 | 81.2007 | 77.4598 | 62.89789982 |
| 58 | 81.8137 | 76.9248 | 62.9350251 |
| 58.5 | 82.2453 | 76.614 | 63.01141414 |
| 59 | 82.47 | 76.5069 | 63.09524043 |
| 59.5 | 82.4576 | 76.5366 | 63.11024348 |
| 60 | 82.168 | 76.572 | 62.91768096 |
| 60.5 | 81.5458 | 76.4036 | 62.30392685 |
| 61 | 80.5115 | 75.743 | 60.98182545 |
| 61.5 | 78.9521 | 74.2563 | 58.62690823 |
| 62 | 76.7092 | 71.6439 | 54.95746254 |
| 62.5 | 73.574 | 67.7567 | 49.85131446 |
| 63 | 69.3133 | 62.6944 | 43.45555756 |
| 63.5 | 63.7968 | 56.8124 | 36.2444932 |
| 64 | 57.3686 | 50.6164 | 29.03792005 |
| 64.5 | 51.5131 | 44.6044 | 22.97710918 |
| 65 | 49.0297 | 39.1471 | 19.19370569 |
| P-V (44-60) | | | 0.212343663 |

While specific embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A beamsplitter comprising:
a first fluoride prism;
a second fluoride prism;
a coating interface between the first and second fluoride prisms,
wherein an overall R(s)*T(p) function of the beamsplitter varies no more than ±2.74% in the range of 40-50 degrees of incidence.

2. The beamsplitter of claim 1, wherein the coating interface includes alternating layers of $MgF_2$ and $LaF_3$.

3. The beamsplitter of claim 1, wherein the coating interface includes at least 27 alternating layers of high and low refractive index materials.

4. The beamsplitter of claim 1, wherein the coating interface includes at least 29 alternating layers of high and low refractive index materials.

5. The beamsplitter of claim 1, wherein the coating interface includes alternating layers of $NdF_3$ and $AlF_3$.

6. The beamsplitter of claim 1, wherein the coating interface includes at least 30 alternating layers of high and low refractive index materials.

7. The beamsplitter of claim 1, wherein the coating interface includes at least 32 alternating layers of high and low refractive index materials.

8. The beamsplitter of claim 1, wherein the coating interface includes at least 11 alternating layers of high and low refractive index materials.

9. The beamsplitter of claim 1, wherein the coating interface includes at least 21 alternating layers of high and low refractive index materials.

10. The beamsplitter of claim 1, wherein the first and second prisms include $CaF_2$.

11. A beamsplitter comprising:
a first fused silica prism;
a second fused silica prism;
a coating interface between the first and second fused silica prisms,
wherein an overall R(s)*T(p) function of the beamsplitter varies no more than ±2.74% in the range of 40-50 degrees of incidence.

12. The beamsplitter of claim 1, wherein the overall R(s)*T(p) function of the beamsplitter varies no more than 0.87% in the range of 35-55 degrees of incidence.

13. The beamsplitter of claim 1, wherein the overall R(s)*T(p) function of the beamsplitter varies no more than ±2.74% in the range of 35-55 degrees of incidence.

14. The beamsplitter of claim 1, wherein the beamsplitter operates at about 157.6 nm.

15. The beamsplitter of claim 1, wherein the beamsplitter operates at about 193 nm.

16. A beamsplitter comprising:
a first fluoride prism;
a second fluoride prism;
a coating interface between the first and second fluoride prisms,
wherein an overall R(s)*T(p) function of the beamsplitter varies no more than ±0.445% in the range of 40-50 degrees of incidence.

17. The beamsplitter of claim 16, wherein the coating interface includes alternating layers of $MgF_2$ and $LaF_3$.

18. The beamsplitter of claim 16, wherein the coating interface includes at least 27 alternating layers of high and low refractive index materials.

19. The beamsplitter of claim 16, wherein the coating interface includes at least 29 alternating layers of high and low refractive index materials.

20. The beamsplitter of claim 16, wherein the coating interface includes alternating layers of $NdF_3$ and $AlF_3$.

21. The beamsplitter of claim 16, wherein the coating interface includes at least 30 alternating layers of high and low refractive index materials.

22. The beamsplitter of claim 16 wherein the coating interface includes at least 32 alternating layers of high and low refractive index materials.

23. The beamsplitter of claim 16, wherein the coating interface includes at least 11 alternating layers of high and low refractive index materials.

24. The beamsplitter of claim 16, wherein the coating interface includes at least 21 alternating layers of high and low refractive index materials.

25. The beamsplitter of claim 16, wherein the first and second prisms include $CaF_2$.

26. A beamsplitter comprising:
a first fused silica prism;
a second fused silica prism;
a coating interface between the first and second fused silica prisms,
wherein an overall R(s)*T(p) function of the beamsplitter varies no more than ±0.445% in the range of 40-50 degrees of incidence.

27. The beamsplitter of claim 16, wherein the overall R(s)*T(p) function of the beamsplitter varies no more than ±0.87% in the range of 35-55 degrees of incidence in the ultraviolet range.

28. A polarizing beamsplitter comprising:
a first fluoride prism;
a second fluoride prism;
a coating interface between the first and second fluoride prisms,
wherein an apodization function of the polarizing beamsplitter is relatively flat to within ±2.74% in the range of 40-50 degrees of incidence.

29. A beamsplitter comprising:
a first fluoride prism;
a second fluoride prism;
a coating interface between the first and second fluoride prisms, wherein an overall R(s)*T(p) function of the beamsplitter varies no more than ±0.1% in the range of 44-60 degrees of incidence.

30. The beamsplitter of claim 29, wherein the overall R(s)*T(p) function of the beamsplitter varies no more than ±0.064% in the range of 44-60 degrees of incidence.

31. The beamsplitter of claim 29, wherein the coating interface includes at least 21 alternating layers of high and low refractive index materials.

32. The beamsplitter of claim 29, wherein the first and second prisms include $CaF_2$.

33. A method of forming a polarizing beamsplitter comprising the steps of:
forming a coating on a first fluoride prism, wherein an apodization function of the polarizing beamsplitter is relatively flat to within ±2.74% in the range of 40-50 degrees of incidence; and joining the first fluoride prism with the second fluoride prism to form the polarizing beamsplitter.

34. The method of claim 33, wherein the step of forming the coating includes the step of forming alternating layers of $MgF_2$ and $LaF_3$.

35. The method of claim 34, wherein the step of forming alternating layers of $MgF_2$ and $LaF_3$ forms at least 27 alternating layers.

36. The method of claim 33, wherein the step of forming the coating includes the step of forming alternating layers of $NdF_3$ and $AlF_3$.

37. The method of claim 33, further comprising providing the first and second prisms as $CaF_2$ prisms.

38. A method of forming a polarizing beamsplitter comprising the steps of:
  forming a coating on a first fused silica prism, wherein an apodization function of the polarizing beamsplitter varies no more than ±2.11% in the range of 35-55 degrees of incidence; and
  joining the first fused silica prism with the second fused silica prism to form the beamsplitter.

39. The method of claim 33, further comprising forming the coating so that the apodization function of the polarizing beamsplitter varies no more than ±0.87% in the range of 35-55 degrees of incidence.

40. The method of claim 33, further comprising forming the coating so that the apodization function of the polarizing beamsplitter varies no more than ±2.74% in the range of 35-55 degrees of incidence.

41. The method of claim 33, further comprising forming the coating so that the polarizing beamsplitter operates at about 157.6 nm.

42. The method of claim 33, further comprising forming the coating so that the polarizing beamsplitter operates at about 193 nm.

43. The method of claim 33, comprising forming the coating so that the apodization function of the polarizing beamsplitter varies no more than ±0.87% in the range of 35-55 degrees of incidence.

44. The method of claim 33, further comprising forming the coating so that the apodization function of the polarizing beamsplitter varies no more than ±2.74% in the range of 35-55 degrees of incidence.

* * * * *

UNITED STATES PATENT AND TRADEMARK OFFICE
CERTIFICATE OF CORRECTION

PATENT NO. : 7,414,785 B2 Page 1 of 1
APPLICATION NO. : 10/458629
DATED : August 19, 2008
INVENTOR(S) : Ronald A. Wilklow It is certified that error appears in the above-identified patent and that said Letters Patent is hereby corrected as shown below:

Title Page
Item (56), Reference Cited section please add:
--EP    0 554 994 A1    08/1993
  EP    0 869 203 A2    10/1998
  EP    0 939 467 A2    09/1999
"Prisms," Casix, Inc. www.casix.com/old%20web/optics06.htm. copyright 1998, last revised Oct. 20, 1998, 3 pages.
Nonogaki et al., "Microlithography Fundamentals in Semiconductor Devices and Fabrication Technology," (Marcel Kekker, Inc.) New York, N.Y. 1998, pp1 through 25.--

Signed and Sealed this

Sixteenth Day of December, 2008

JON W. DUDAS
*Director of the United States Patent and Trademark Office*